United States Patent
Hwang et al.

(10) Patent No.: US 11,546,851 B2
(45) Date of Patent: Jan. 3, 2023

(54) METHOD FOR TRANSMITTING/RECEIVING SIGNAL IN WIRELESS COMMUNICATION SYSTEM AND DEVICE THEREFOR

(71) Applicant: LG Electronics Inc., Seoul (KR)

(72) Inventors: Seunggye Hwang, Seoul (KR); Changhwan Park, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 13 days.

(21) Appl. No.: 16/962,288

(22) PCT Filed: Jan. 25, 2019

(86) PCT No.: PCT/KR2019/001077
§ 371 (c)(1),
(2) Date: Jul. 15, 2020

(87) PCT Pub. No.: WO2019/147061
PCT Pub. Date: Aug. 1, 2019

(65) Prior Publication Data
US 2020/0367168 A1 Nov. 19, 2020

Related U.S. Application Data

(60) Provisional application No. 62/622,152, filed on Jan. 26, 2018.

(51) Int. Cl.
*H04W 52/02* (2009.01)
*H04W 76/27* (2018.01)
(Continued)

(52) U.S. Cl.
CPC ....... *H04W 52/0229* (2013.01); *H04L 5/0053* (2013.01); *H04W 48/08* (2013.01);
(Continued)

(58) Field of Classification Search
CPC ............... H04B 7/0452; H04B 7/0695; H04W 74/0833
See application file for complete search history.

(56) References Cited

U.S. PATENT DOCUMENTS

2012/0275364 A1 11/2012 Anderson et al.
2014/0126442 A1 5/2014 Jafarian et al.
(Continued)

FOREIGN PATENT DOCUMENTS

KR 1020060131049 12/2006
WO WO2016209329 12/2016

OTHER PUBLICATIONS

U.S. Appl. No. 62/544,276 provisional application U.S. Appl. No. 62/564,976 provisional application U.S. Appl. No. 62/583,347 provisional application U.S. Appl. No. 62/544,177 provisional application (Year: 2017).*

(Continued)

*Primary Examiner* — Ayaz R Sheikh
*Assistant Examiner* — Debebe A Asefa
(74) *Attorney, Agent, or Firm* — Fish & Richardson P.C.

(57) ABSTRACT

The present invention relates to a method by which a terminal transmits/receives a signal in a wireless communication system and a device therefore and, more particularly, to: a method comprising the steps of receiving configuration information related to the activation or the deactivation of a wake-up signal (WUS), and monitoring the WUS and a channel corresponding to the WUS, when the WUS is activated on the basis of the configuration information, wherein the configuration information related to the activation or the deactivation of the WUS is configured to be terminal-specific; and a device therefor.

7 Claims, 10 Drawing Sheets

(51) Int. Cl.
　　　*H04L 5/00*　　　(2006.01)
　　　*H04W 48/08*　　(2009.01)
　　　*H04W 72/04*　　(2009.01)

(52) U.S. Cl.
　　　CPC ..... *H04W 52/0216* (2013.01); *H04W 72/042* (2013.01); *H04W 76/27* (2018.02)

(56) References Cited

U.S. PATENT DOCUMENTS

| | | | |
|---|---|---|---|
| 2019/0320463 A1* | 10/2019 | Yamada | H04W 16/14 |
| 2020/0077338 A1* | 3/2020 | Sui | H04W 52/0229 |
| 2020/0178172 A1* | 6/2020 | Thangarasa | H04W 52/02 |
| 2020/0229095 A1* | 7/2020 | Shrestha | H04W 52/0235 |

OTHER PUBLICATIONS

U.S. Appl. No. 62/476,197 provisional application (Year: 2017).*

Demirkol et al., "Wake-up Receivers for Wireless Sensor Networks: Benefits and Challenges," Wireless Communications, vol. 16, Issue: 4, pp. 88-96, dated Oct. 9, 2009, 8 pages.

PCT International Search Report in International Application No. PCT/KR2019/001077, dated Apr. 9, 2019, 16 pages (with English translation).

\* cited by examiner

FIG. 1
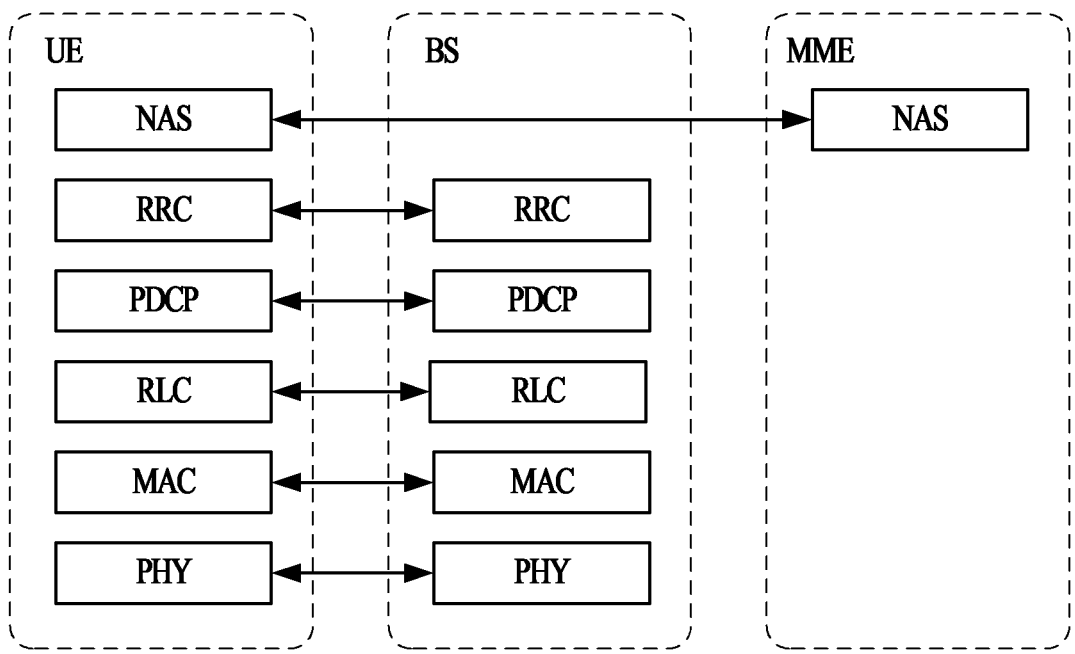
(a) Control plane protocol stack
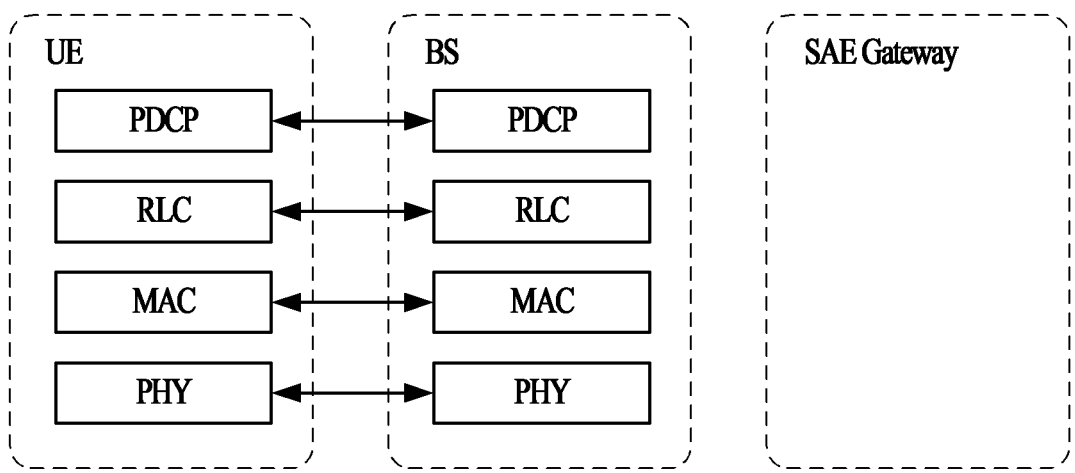
(b) User plane protocol stack

FIG. 10

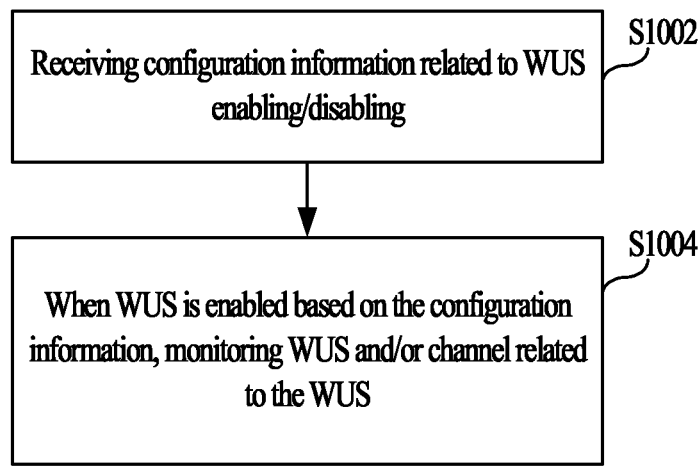

\* Method 1: Configuration information related to WUS enabling/disabling is configured in cell unit (and/or cell-commonly)

\* Method 2: Configuration information related to WUS enabling/disabling is configured per resource part (and/or resource part-specifically)

\* Method 3: Configuration information related to WUS enabling/disabling is configured per UE (and/or UE-specifically)

\* Method 4: Configuration information related to WUS enabling/disabling is independently configured per WUS type \* Method 5: Configuration information related to specific WUS enabling/disabling is configured only if another specific WUS is enabled

METHOD FOR TRANSMITTING/RECEIVING SIGNAL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2019/001077, filed on Jan. 25, 2019, which claims the benefit of U.S. Provisional Application No. 62/622,152, filed on Jan. 26, 2018. The disclosures of the prior applications are incorporated by reference in their entirety.

TECHNICAL FIELD

The present disclosure relates to a wireless communication system, and more specifically relates to a method of transmitting or receiving a wake-up signal (WUS) or channel and an apparatus therefor.

BACKGROUND ART

When a new radio access technology (RAT) system is introduced, as more and more communication devices require larger communication capacity, there is a need for improved mobile broadband communication as compared to existing RAT. In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, considering enhanced mobile broadband communication (eMBB), massive MTC (mMTC), URLLC (Ultra-Reliable Low-Latency Communication), etc, the next generation wireless access technology is being discussed, and such a technology is referred to as new RAT (NR) for convenience.

DETAILED DESCRIPTION OF DISCLOSURE

Technical Tasks

A technical task of the present disclosure is to provide a method of transceiving a signal efficiently in a wireless communication system and apparatus therefor. Particularly, a technical task of the present disclosure is to provide a method of transceiving a Wake-Up Signal (WUS) efficiently in a wireless communication system and apparatus therefor.

Technical tasks obtainable from the present disclosure are non-limited by the above-mentioned technical task, and other unmentioned technical tasks can be clearly understood from the following description by those having ordinary skill in the technical field to which the present disclosure pertains.

Technical Solutions

In a first aspect of the present invention, provided herein is a method of receiving a downlink signal by a user equipment (UE) in a wireless communication system, the method comprising: receiving configuration information related to enabling or disabling of a wake up signal (WUS); and when the WUS is enabled based on the configuration information, monitoring the WUS and a channel corresponding to the WUS, wherein the configuration information related to the enabling or disabling of the WUS is configured UE-specifically.

In a second aspect of the present invention, provided herein is a user equipment (UE) for receiving a downlink signal in a wireless communication system, the UE comprising: a radio frequency (RF) transceiver; and a processor operatively connected to the RF transceiver, wherein the processor is configured to control the RF transceiver to receive configuration information related to enabling or disabling of a wake up signal (WUS), and to, when the WUS is enabled based on the configuration information, monitor the WUS and a channel corresponding to the WUS, and wherein the configuration information related to the enabling or disabling of the WUS is configured UE-specifically.

Preferably, the configuration information may be received through a UE-specific radio resource control (RRC) layer signal.

Preferably, the configuration information may be received through cell-common system information, and the cell-common system information may represent system information commonly applied to all resource parts of a cell, and the resource part may represent a unit of a region used for data transmission and reception of the UE among resources of the cell.

Preferably, even if the WUS is enabled cell-commonly, when the WUS is disabled UE-specifically for the UE based on the configuration information, monitoring the WUS and the channel corresponding to the WUS may be skipped.

Preferably, even if the WUS is disabled cell-commonly, when the WUS is enabled UE-specifically for the UE based on the configuration information, monitoring the WUS and the channel corresponding to the WUS may be performed.

Preferably, the configuration information may be received through resource part specific system information, and the resource part specific system information may represent system information applied per resource part of a cell, and the resource part may represent a unit of a region used for data transmission and reception of the UE among resources of the cell.

Preferably, even if the WUS is enabled resource part-specifically, when the WUS is disabled UE-specifically for the UE based on the configuration information, monitoring the WUS and the channel corresponding to the WUS may be skipped.

Preferably, even if the WUS is disabled resource part-specifically, when the WUS is enabled UE-specifically for the UE based on the configuration information, monitoring the WUS and the channel corresponding to the WUS may be performed.

Preferably, when a coverage level of the UE is greater than a specific threshold value based on the configuration information, the WUS may be determined as disabled.

Preferably, when a coverage level of the UE is smaller than a specific threshold value based on the configuration information, the WUS may be determined as disabled.

Preferably, when a coverage level of the UE is greater than a specific threshold value based on the configuration information, the WUS may be determined as enabled.

Preferably, when a coverage level of the UE is smaller than a specific threshold value based on the configuration information, the WUS may be determined as enabled.

Preferably, the coverage level may correspond to a maximum repetition number of the channel corresponding to the WUS or a repetition number of a channel corresponding to the WUS lastly received by the UE.

Preferably, the specific threshold value may be indicated through a higher layer signal.

Advantageous Effects

A technical task of the present disclosure is to provide a method of transceiving a signal efficiently in a wireless communication system and apparatus therefor. Particularly, a technical task of the present disclosure is to provide a method of transceiving a Wake-Up Signal (WUS) efficiently in a wireless communication system and apparatus therefor.

Effects obtainable from the present disclosure are non-limited by the above-mentioned effects. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 illustrates a control plane and a user plane of a radio interface protocol between a user equipment and E-UTRAN.

FIG. 10 illustrates a flowchart of a method according to the present disclosure.

BEST MODE FOR DISCLOSURE

Figure 2:
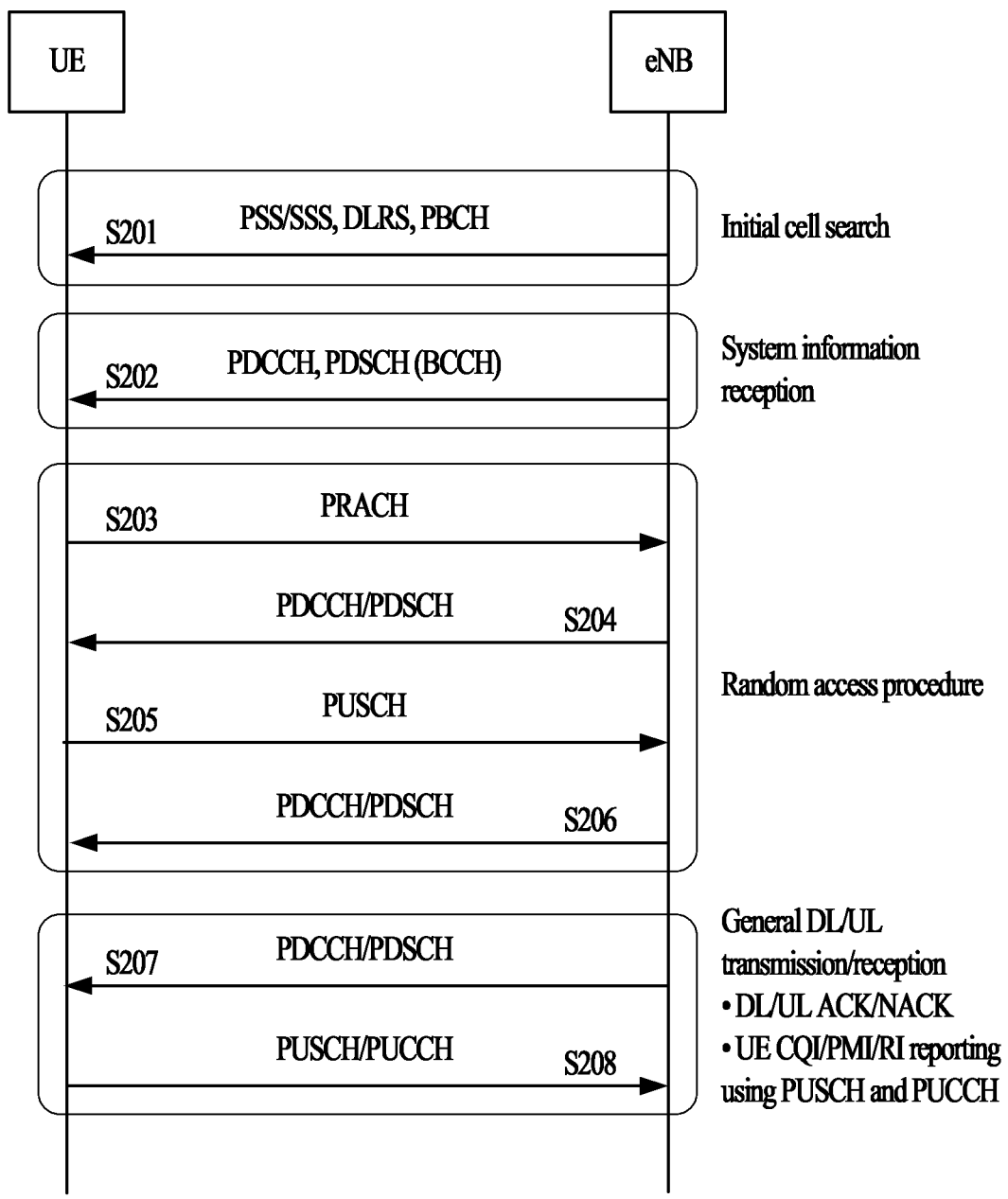
FIG. 2 illustrates physical channels and a general method for transmitting signals using the physical channels.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. LTE-Advanced (LTE-A) and LTE-A pro are evolved versions of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present invention, for simplicity, this technology will be referred to as NR (New Radio or New RAT).

For clarity of explanations, the following description focuses on 3GPP LTE/LTE-A/LTE-A pro system. However, technical principles of the present invention are not limited thereto. Further, a particular terminology is provided for better understanding of the present invention. However, such a particular terminology may be changed without departing from the technical principles of the present invention. For example, the present invention may be applied to a system in accordance with a 3GPP LTE/LTE-A/LTE-A pro system as well as a system in accordance with 3GPP NR standard, another 3GPP standard, IEEE 802.xx standard, 3GPP2 standard, or a next-generation communication standard.

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), gNB (gNodeB), a base transceiver system (BTS), an access point (AP), a processing server (PS), a transmission point (TP), etc. In the present specification, a base station (BS) may be interchangeably referred to as an eNB or gNB.

Protocol Layers

FIG. 1 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing a base station (eNB) is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Physical Channels and Signals Reception/Transmission

In a wireless access system, a user equipment (UE) may receive information from a base station (BS) in downlink (DL) and transmit information in uplink (UL). The information transmitted or received by the UE may include data and various control information. In addition, there are various physical channels according to the type or use of the information transmitted or received by the UE.

FIG. 2 illustrates physical channels and a general method for transmitting signals through the physical channels to which the present invention can be applied.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble through a physical random access channel (PRACH) (S203) and may receive a response message to the preamble through a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted through a PUCCH periodically. However, if control information and traffic data should be transmitted simultaneously, they may be transmitted through a PUSCH. In addition, the UCI may be transmitted aperiodically through the PUSCH, upon receipt of a request/command from a network.

Radio Frame Structure (LTE/LTE-A/LTE-A Pro)

Figure 3:
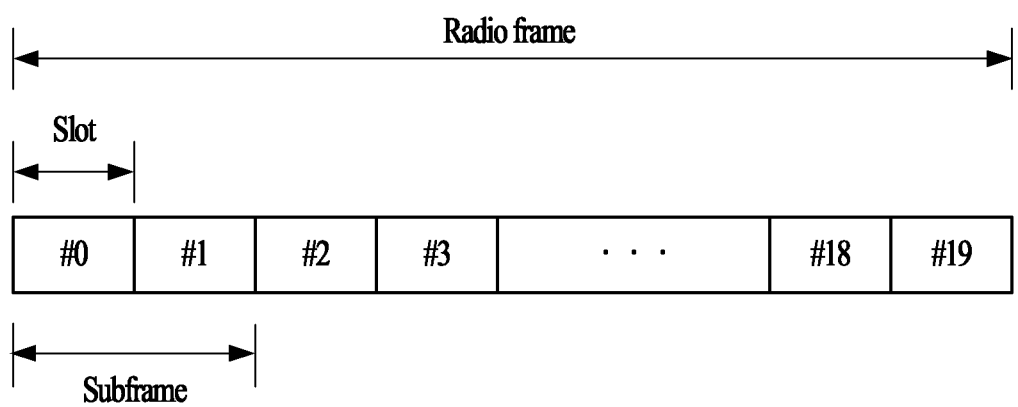
FIG. 3 illustrates a structure of a radio frame.

FIG. 3 illustrates a structure of a radio frame that may be used in the present invention. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 3 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB)

as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Radio Frame Structure (NR)

The NR system may support various numerologies. The numerology may be defined by subcarrier spacing and cyclic prefix (CP) overhead. Multiple subcarrier spacing may be derived by scaling basic subcarrier spacing by an integer N (or p). In addition, even though very low subcarrier spacing is assumed not to be used at a very high subcarrier frequency, a numerology to be used may be selected independently from frequency bands. In the NR system, various frame structures may be supported based on multiple numerologies.

Table 1 shows multiple OFDM numerologies supported in the NR system. In Table 1, μ represents numerology, and Δf represents a subcarrier spacing.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Tables 2 and 3 show radio frame structures according to the numerologies of Table 1. Table 2 shows the number of OFDM symbols per slot ($N_{symb}^{slot}$), the number of slots per radio frame ($N_{slot}^{frame,\mu}$), and the number of slots per subframe ($N_{slot}^{subframe,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

LTE/LTE-A system may perform scheduling and transmission/reception of physical channels and/or signals in the unit of subframe, while NR system may perform scheduling and transmission/reception of physical channels and/or signals in the unit of slot.

Physical Resources

Figure 4:
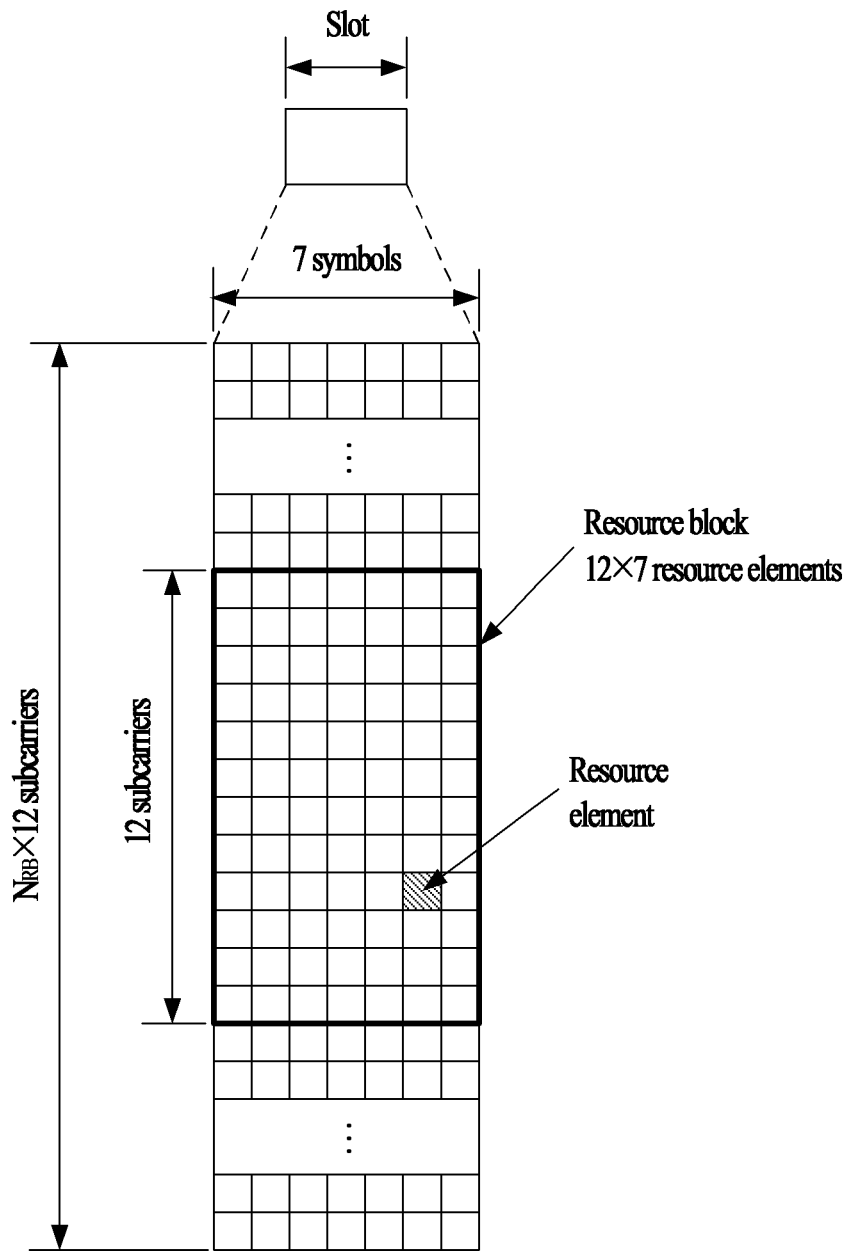
FIG. 4 illustrates a resource grid of a downlink slot.

FIG. 4 illustrates a resource grid of one downlink slot that may be used in the present invention.

Referring to FIG. 4, a downlink slot includes a plurality of OFDM symbols in the time domain. One downlink slot may include 7 OFDM symbols and a resource block (RB) may include 12 subcarriers in the frequency domain. However, the present invention is not limited thereto. Each element of the resource grid is referred to as a Resource Element (RE). One RB includes 12×7 REs. The number of RBs in a DL slot, $N^{DL}$, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 5:
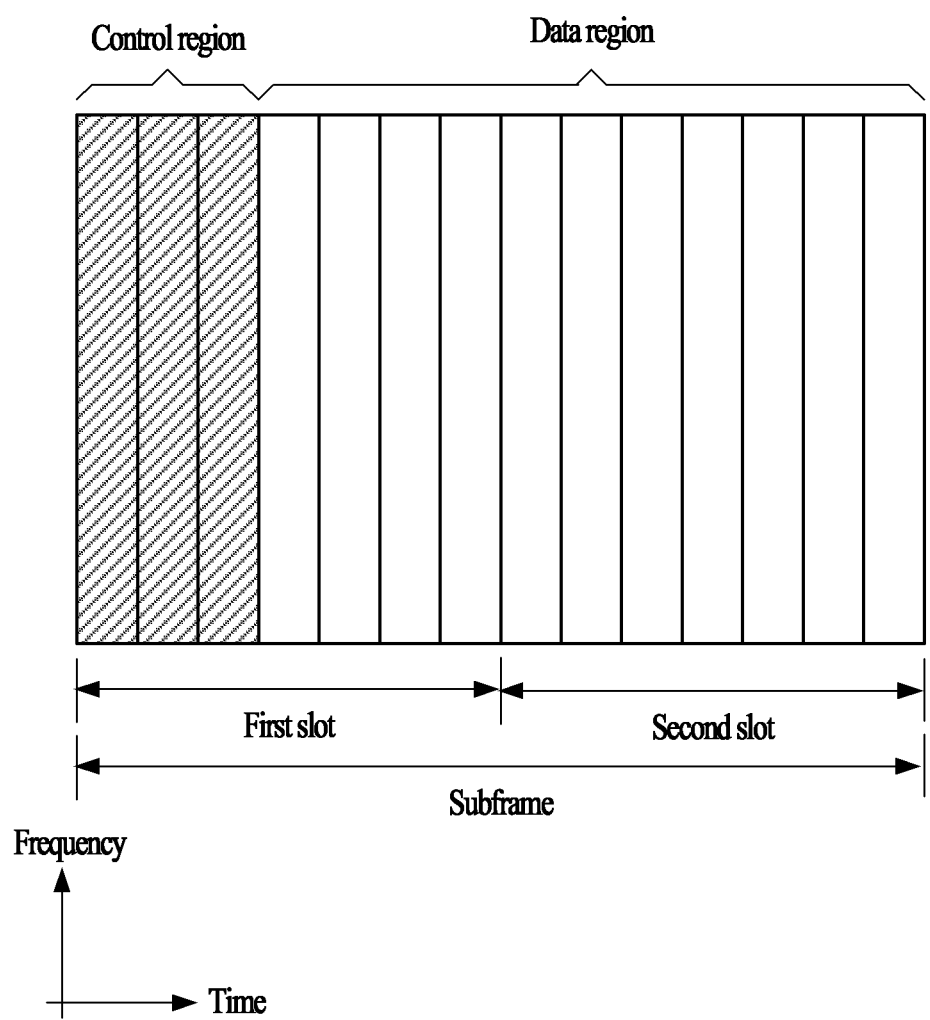
FIG. 5 illustrates a downlink subframe structure.

FIG. 5 illustrates a downlink subframe structure that may be used in the present invention.

Referring to FIG. 5, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible in the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A base station determines a PDCCH format according to control information to be transmitted to a UE, and attaches a cyclic redundancy check (CRC) to the control information for error detection. CRC is masked with an identifier (e.g. radio network temporary identifier (RNTI)) according to an owner or usage of the PDCCH. In other words, PDCCH is CRC-scrambled with an identifier (e.g. RNTI).

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, in the case where the PDCCH is de-masked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in a search space for a specific UE, the remaining CCEs are not present. Thus, a base station may not find CCE resources in which the PDCCH is to be transmitted to all available UEs in a given subframe. In order to minimize the possibility that such blocking is subsequent to a next subframe, a start position of the USS is UE-specifically hopped.

Figure 6:
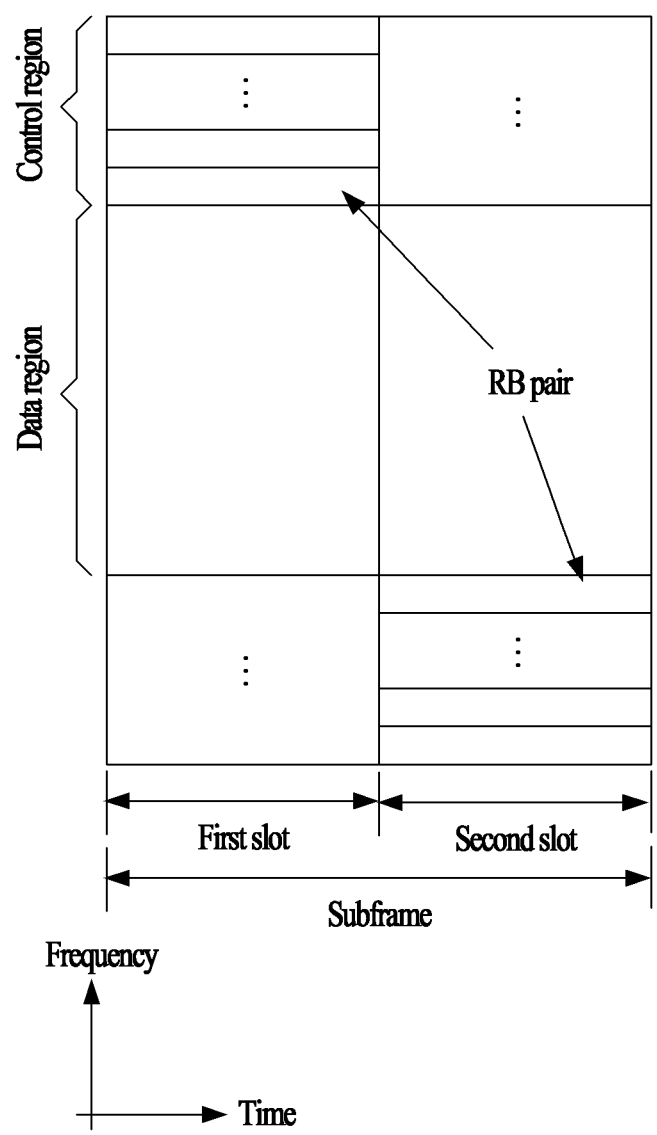
FIG. 6 illustrates an uplink subframe structure.

FIG. 6 illustrates an exemplary structure of an uplink subframe that may be used in the present invention.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis, and performs hopping on the border of the slots.

The PUCCH may be used to transmit the following control information.
  SR (Scheduling Request): information used to request uplink UL-SCH resource. The SR is transmitted using an on-off keying (OOK) scheme.
  HARQ ACK/NACK: a response signal to the PDCCH indicating semi-persistent scheduling (SPS) release and a downlink data packet on the PDSCH. HARQ ACK/

NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords.

CQI (Channel Quality Indicator): feedback information on a downlink channel. MIMO (Multiple Input Multiple Output) related feedback information includes a rank indicator (RI) and a precoding matrix indicator (PMI). 20 bits per subframe are used.

Bandwidth Part & Carrier

In the LTE/LTE-A system, bandwidths up to maximum 20 MHz are supported per one Component Carrier (CC). In the NR system, bandwidths up to maximum 400 MHz may be supported per one Component Carrier (CC). In case that a User Equipment (UE) operates on such a wideband CC while turning on an RF transceiver for all CCs all the time, battery consumption may increase. Or, if several use cases (e.g., enhanced Mobile BroadBand (eMBB), Ultra Reliability Low Latency Communication (URLLC), (massive Machine Type Communication (mMTC), etc.) are supportable within a single wideband CC in an NR system to which the present disclosure is applicable, the NR system may support a different numerology (e.g., subcarrier spacing) per frequency band within the corresponding CC. Alternatively, a UE operating in the NR system may have different capability for a maximum bandwidth.

Considering various matters above, a Base Station (BS) of an NR system may instruct a UE to operate not on an entire bandwidth but on a partial bandwidth. In the present specification, such a partial bandwidth will be referred to as a BandWidth Part (BWP). The BandWidth Part (BWP) may consist of Resource Blocks (RBs) consecutive on a frequency axis and correspond to a single numerology (e.g., subcarrier spacing, Cyclic Prefix (CP) length, slot/mini-slot duration, etc.).

In some implementations, a BS may configure a multitude of CCs within a single CC configured for a UE. For example, a BS may configure a first BWP occupying a relatively small frequency region for a PDCCH monitoring slot. Here, PDSCH indicated by PDCCH may be scheduled on a second BWP greater than the first BWP. Alternatively, in case that a multitude of UEs are concentrated, a BS may configure a different BWP for some of the UEs for load balancing.

Accordingly, a BS may configure at least one DL/UL BWP for a UE related to a wideband CC, and activate at least one DL/UL BWP among DL/BL BWPs configured at a specific timing (by first layer signaling (L1 signaling), Medium Access Control (MAC) Control Element (CE) or Radio Resource Control (RRC) signaling, etc.). Here, the activated DL/UL BWP may be defined as an active DL/UL BWP.

In addition, when a UE is in the course of an initial access procedure or in a situation before RRC connection setup or the like, the UE may not receive configuration of a DL/UL BWP from a BS. In such a situation, the UE may assume a default DL/UL BWP. And, the DL/UL BWP assumed by the UE may be referred to as an initial active DL/UL BWP.

Machine Type Communication (MTC)

MTC is provided for communication applicable to Machine-to-Machine (M2M), Internet-of-Things (IoT) and the like, which does not require considerable throughput, and means the communication technology adopted to meet the requirements of the IoT service in $3^{rd}$ Generation Partnership Project (3GPP). Particularly, MTC may be implemented to satisfy low cost & low complexity, enhanced coverage, and low power consumption. In the present specification, MTC may be referred to as other terms such as enhanced MTC (eMTC), LTE-M1/M2, Bandwidth reduced Low complexity/Coverage Enhanced (BL/CE), non-BL UE (in enhanced coverage), NR MTC, enhanced BL/CE, etc.

MTC may operate on a specific system bandwidth (or a channel bandwidth) only. For example, a specific system bandwidth may correspond to 6 RBs (or 1.08 MHz) of LTE system, and may be defined in consideration of a frequency range and a SubCarrier Spacing (SCS) in case of NR system. The specific system bandwidth may correspond to 6 non-overlapping consecutive Physical Resource Blocks (PRBs) in a frequency domain, and may be referred to as a NarrowBand (NB). In NR system, MTC may operate on at least one BandWidth Part (BWP) or a specific band of BWP. In MTC, a physical channel and signals may be transceived on a narrowband. MTC may be supported in a system having a bandwidth much greater than 1.08 MHz, but a physical channel signal transceived by MTC may be limited to 1.08 MHz. The system having the much greater bandwidth may include LTE/LTE-A/LTE-A Pro system, NR system, etc.

PDCCH used in MTC is referred to as MTC PDCCH (MPDCCH). MPDCCH exists across maximum 6 RBs in frequency domain and 1 subframe in time domain. For coverage enhancement, MTC may repeatedly transmit Physical Broadcast Channel (PBCH), Physical Random Access Channel (PRACH), MTC Physical Downlink Control Channel (M-PDCCH), Physical Downlink Shared Channel (PDSCH), Physical Uplink Control Channel (PUCCH), and Physical Uplink Shared Channel (PUSCH). Such MTC repetitive transmission can decode an MTC channel in a very poor signal quality or power case such as a poor environment such as a basement and the like, thereby bringing effects of cell radius increase and signal permeation.

Master Information Block (MIB) is transceived through PBCH. In MTC, MIB is repeated in a subframe (e.g., subframe #9 in case of FDD, subframe #5 in case of TDD) different from a first slot of subframe #0 of a radio frame. In MIB, 5 reserved bits are used to transmit scheduling information on a new SIB1-BR (system information block for bandwidth reduced device) including a time/frequency position and transport block size. SIB1-BR is transmitted directly on PDSCH without any control channel associated with the SiB1-BR. SIB1-BR may not change in 512 radio frames (5120 ms) to allow a multitude of subframes to be combined. The overall function and information carried on SIB1-BR are similar to SIB1 of LTE system.

MTC supports 2 modes (CE mode A and CE mode B) and 4 different levels. Table 4 exemplarily shows Cove rage Enhancement (CE) modes and levels supported in MTC.

TABLE 4

| Mode | Level | Description |
| --- | --- | --- |
| Mode A | Level 1 | No repetition |
|  | Level 2 | Small Number of Repetition |
| Mode B | Level 3 | Medium Number of Repetition |
|  | Level 4 | Large Number of Repetition |

In Table 4, CE mode A is a mode for small coverage enhancement supported with complete mobility and Channel State Information (CSI) feedback, and may be configured to have no repetition or the small number of repetitions. CE mode B is a mode for a UE having extremely poor coverage condition of supporting CSI feedback and limited mobility, and may be configured to have the large number of repetitions.

MTC operation mode is determined by a BS, and each level may be determined by a UE. Particularly, a BS transmits an RRC layer signal, which includes information on an MTC operation mode, to a UE. For example, the RRC layer signal may include an RRC connection setup message, an RRC connection reconfiguration message, an RRC connection reestablishment message, etc. The UE determines a level in each operation ode and transmits the determined level to the BS. Particularly, an MTC UE determines a level in an operation mode based on a measured channel quality (e.g., RSRP, RSRQ, SINR, etc.), and may be then able to inform a BS of the determined level using a PRACH resource (e.g., frequency, time, preamble, etc.) corresponding to the determined level.

NarrowBand-Internet of Things (NB-IoT)

NB-IoT may mean a system for supporting low complexity and low power consumption through a system BandWidth (BW) corresponding to 1 Physical Resource Block (PRB) of a wireless communication system (e.g., LTE system, NR system, etc.). NB-IoT may be referred to as other terms such as NB-LTE, NB-IoT enhancement, enhanced NB-IoT, further enhanced NB-IoT, NB-NR, etc. In NB-IoT system, a frequency can be efficiently used by allocating 1 PRB of a legacy system for NB-IoT usage. Since a UE supportive of NB-IoT recognizes a single PRB as each carrier, the PRB or carrier mentioned in the present specification may be interpreted as the same meaning.

A physical channel of NB-IoT system may be represented in 'Narrowband (N)' added form for the distinguishment from a legacy system. For example, a downlink physical channel may be defined as Narrowband Physical Broadcast Channel (NPBCH), Narrowband Physical Downlink Control Channel/Narrowband Enhanced Physical Downlink Control Channel (NPDCCH/NEPDCCH)), Narrowband Physical Downlink Shared Channel (NPDSCH, etc. A downlink physical signal may be defined as Narrowband Primary Synchronization Signal (NPSS), Narrowband Secondary Synchronization Signal (NSSS), Narrowband Reference Signal (NRS), Narrowband Positioning Reference Signal (NPRS), Narrowband Wake Up Signal (NWUS), etc. NPBCH, NPDCCH, NPDSCH and the like, which are downlink channels of NB-IoT system, may be repeatedly transmitted for coverage enhancement.

Master Information Block-NarrowBand (MIB-NB) is transceived through NPBCH and used to transmit scheduling information on System Information Block type 1 for NarrowBand (SIB1-NB). MIB-NB and SIB1-NB are used for the similar purposes of MIB-BR and SIB1-BR, respectively.

NB-IoT may operate in multicarrier mode. In NB-IoT, a carrier may be defined as an anchor carrier (or an anchor PRB) or a non-anchor carrier (or a non-anchor PRB). The anchor carrier refers to a carrier for an initial access in NB-IoT, and the rest of carriers may be referred to as non-anchor carriers. For example, a single anchor carrier or a multitude of anchor carriers may exist on a system.

Discontinuous Reception (DRX) Operation

As a major scenario of cellular IoT, a UE may support operations such as exception report, periodic report, network command, software update/reconfiguration, etc. In order to perform such operations battery-efficiently, a UE may be configured to stay in a battery-efficient state mostly, wake up in case of an event occurrence or in specific subframe(s), and perform UL/DL data transmission/reception. To avoid collision between UEs, the aforementioned specific subframe(s) can be configured to be UE-specific using IMSI and the like of a UE. This is mainly used for a periodic paging check, thereby being called a Paging Opportunity (PO).

A BS configures at least one Paging Opportunity (PO) UE-specifically every specific paging cycle, and a UE is made to obtain a paging message at the UE-specifically configured paging opportunity. The paging period may refer to a paging message transmitted period. A UE in RRC-IDLE or RRC-SUSPENDED state may receive a paging message by restoring to a connected state at a paging opportunity configured for itself. The UE-specific paging opportunity may be determined using a parameter and UE identity information (e.g., IMSI) signaled through SIB2.

Figure 7:
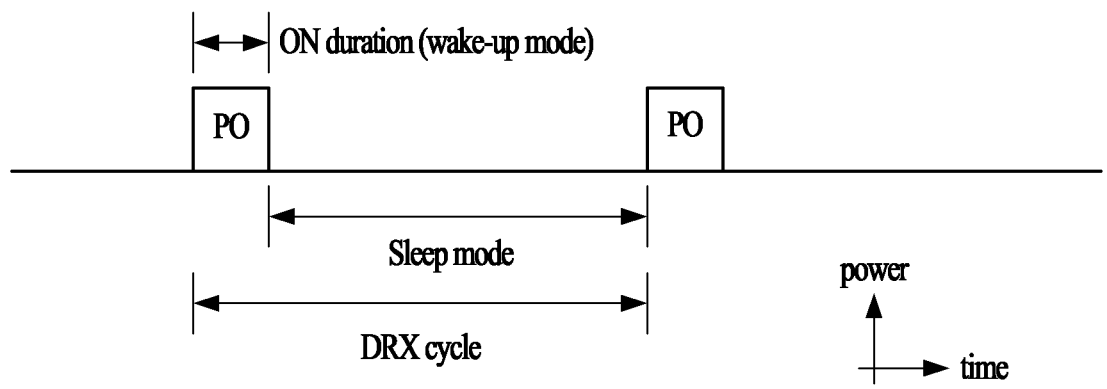
FIG. 7 illustrates a DRX cycle for paging.

FIG. 7 shows a DRX cycle for paging.

For the power consumption reduction, Discontinuous Reception (DRX) may be configured by a BS. A UE may receive DRX configuration information from the BS through higher layer signaling (e.g., RRC layer signaling). The DRX configuration information may include configuration information on DRX cycle, DRX offset and DRX timer, etc. Based on the DRX configuration information, the UE may repeat a sleep mode and a wakeup mode according to the DRX cycle configured by the BS. The DRX cycle may not be aligned with a paging cycle. If a Paging Opportunity (PO) of the DRX configured UE is located in a sleep duration of the DRX cycle, the UE may switch to the wakeup mode to receive a paging message.

In the wakeup mode, the UE may monitor a physical channel (e.g., P-RNTI scrambled PDCCH, MPDCCH, and NPDCCH) related to the paging and detect the corresponding physical channel. In addition, if receiving information indicating a change of its paging ID and/or system information through the detected physical channel, the UE may initialize (or reconfigure) a connection with the BS or receive (or obtain) new system information from the BS. If an ON duration ends, the UE may switch to a sleep mode and then maintain the sleep mode until a next ON duration. In the sleep mode, the UE does not perform an operation for detecting/decoding physical channels transmitted from the BS but may maintain the power for the circuit to maintain the connection with the BS.

Figure 8:
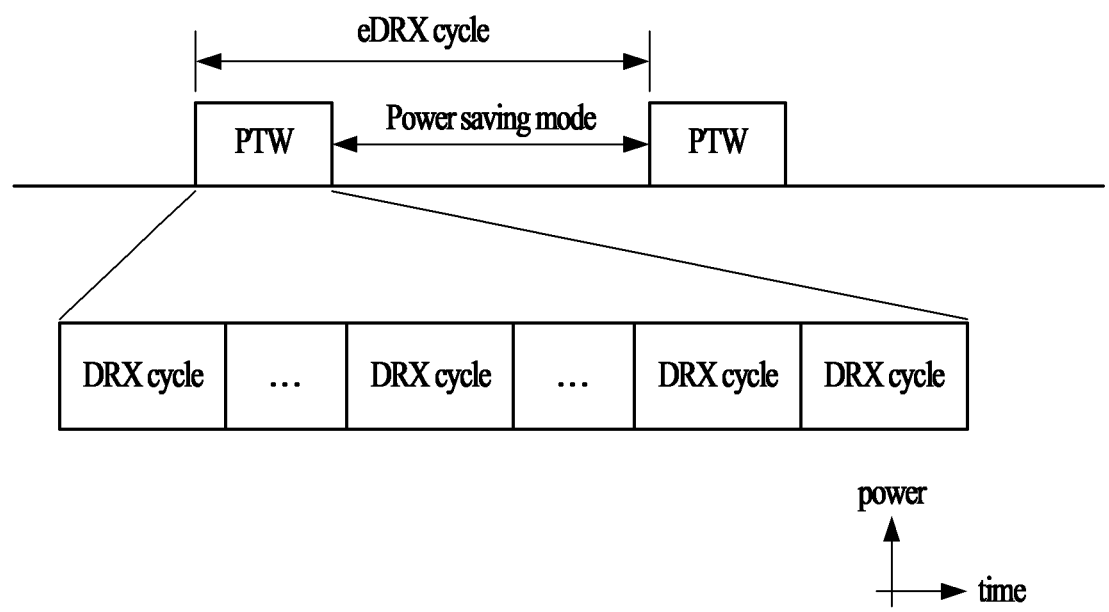
FIG. 8 illustrates an extended DRX cycle.

FIG. 8 shows an example of an extended DRX cycle.

According to DRX cycle configuration, a maximum cycle duration may be limited to 2.56 seconds. Yet, in case of a UE performing data transmission/reception intermittently like an MTC UE or an NB-IoT UE, unnecessary power consumption may occur during a DRX cycle. To reduce such UE's power consumption, a method of substantially extending a DRX cycle based on a Power Saving Mode (PSM) and a Paging Time Window or a Paging Transmission Window (PTW) has been introduced. And, such an extended DRX cycle is simply referred to as an eDRX cycle. PSM refers to a state that a UE consumes power of almost 0. In the PSM, a BS is unable to communicate with the UE at all. In the PTW duration, a UE performs a DRX cycle, thereby switching to a wakeup mode at a Paging Opportunity (PO) of its own to monitor a channel related to a paging. In addition, in the PTW duration, a UE may repeat one or more DRX cycles (e.g., wakeup mode and sleep mode). The number of DRX cycles in the PTW duration may be configured by a BS through a higher layer signal (e.g., an RRC layer signal).

Wake Up Signal (WUS)

Although an eDRX cycle may be extended up to about 3 hours to the maximum, unnecessary power consumption may occur due to monitoring of a channel related to a paging on PTW in a UE that performs data transmission/reception intermittently like an MTC UE or an NB-IoT UE. Thus, a Wake Up Signal (WUS) may be used to additionally reduce the UE's power consumed in monitoring the channel related to the paging.

A WUS is a physical layer signal for a cell to give a UE an instruction indicating whether to monitor a channel (e.g., P-RNTI scrambled PDCCH, MPDCCH, and NPDCCH) related to a paging to receive the paging. In case that a DRX cycle is configured for a UE (or that an eDRX cycle is not configured), a WUS may be associated with one Paging Opportunity (PO) (for itself). In this case, for example, if the UE monitors and detects the WUS, the UE monitors a channel related to a paging at the paging opportunity of its own. If the UE fails to detect the WUS despite monitoring, the UE may stay in a sleep mode without switching to a wakeup mode. If an eDRX cycle is configured for a UE, a WUS may be associated with one or more paging opportunities. In this case, for example, if the UE monitors and detects the WUS, the UE monitors a channel related to a paging at the one or more paging opportunities (associated with the WUS). If the UE fails to detect the WUS despite monitoring, the UE may stay in a sleep mode without switching to a wakeup mode at the one or more paging opportunities (associated with the WUS).

Figure 9:
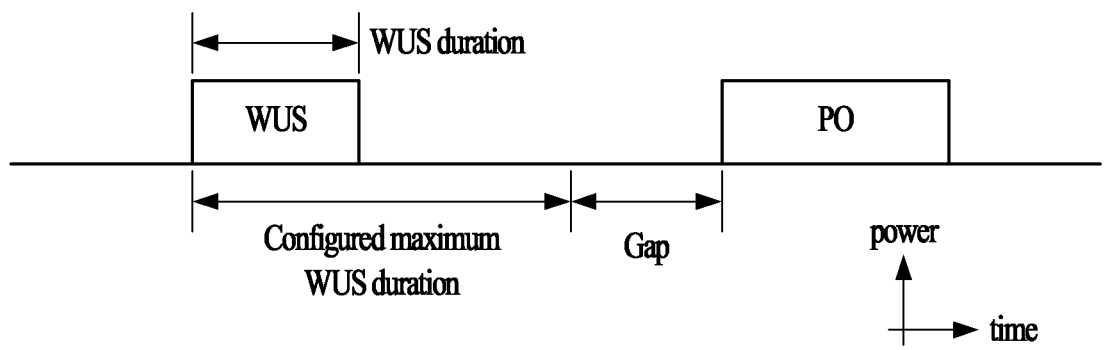
FIG. 9 illustrates a timing relation between a WUS and a paging opportunity.

FIG. 9 shows an example of the timing relation between a WUS and a paging opportunity.

A UE may receive configuration information for a WUS from a BS and monitor the WUS based on the WUS configuration information. The configuration information for the WUS may include a maximum WUS duration, the number of consecutive POs associated with a WUS, gap information, etc. The maximum WUS duration indicates a maximum duration in which a WUS can be transmitted, and may be represented as a ratio with a maximum repetition count (e.g., Rmax) related to PDCCH. The WUS may be repeatedly transmitted more than once within the maximum WUS duration. The number of the consecutive POs associated with the WUS indicates the number of POs the UE will not monitor a channel related to a paging if failing to detect the WUS (or the number of POs the UE will monitor a channel related to the paging if detecting the WUS). The gap information indicates a time gap ranging from an end of the maximum WUS duration to a first PO associated with the WUS.

A UE in good coverage may have a short WUS duration. A UE in bad coverage may have a long WUS duration. Having detected a WUS, a UE does not monitor a WUS until a first PO associated with the WUS. In addition, the UE does not monitor the WUS for a gap duration. Hence, if the UE fails to detect the WUS in a maximum WUS duration, the UE does not monitor a channel associated with a paging at the POs associated with the WUS (or stays in sleep mode).

Disclosure in Accordance with the Present Disclosure

The present disclosure suggests conditions and methods of enabling or disabling a WUS in a system for which a Wake Up Signal (WUS) is usable. The present disclosure also suggests procedures and methods for operations accompanied by a process for enabling or disabling a WUS. In addition, when there are a plurality of types of WUSs and capability for each of the WUSs exists separately, a method suggested by the present disclosure may be used for the purpose of individually enabling/disabling an operation of a WUS related to each capability.

A WUS may be used for the purpose of reducing power consumption due to monitoring of a corresponding channel from the perspective of a receiving end, for the purpose of providing information for monitoring of a corresponding channel, for the purpose of providing partial information of a corresponding channel in advance, and the like. For example, a receiving end may determine whether to monitor a corresponding channel based on information included in a WUS. Yet, due to the restrictions such as a presence or non-presence of WUS support by a transmitting/receiving end, the increase of overhead due to WUS transmission, backward compatibility problem due to a UE failing to support a WUS and the like, there may occur a case that a WUS is not supported. Hence, a function of enabling or disabling a WUS may be necessary. In the present disclosure, to solve such problems, a condition and method for enabling/disabling a WUS and operations accompanied thereby are suggested.

In addition, if there are a plurality of types of WUSs and a capability for each of the WUSs exists separately, it may be difficult to support all the types of WUSs due to the problem of the overhead increase caused by WUS transmission, the problem of the lowered success probability of WUS detection, and the like. For example, the structure of a UE group WUS discussed in 3GPP Release-16 MTC/NB-IoT (Machine Type Communication/NarrowBand Internet of Things) may need radio resources in time domain, frequency domain and/or code domain apart from a WUS defined in Release-15 MTC/NB-IoT. To solve such a problem, if there are a plurality of types of WUSs and a capability for each of the WUSs exists separately, the present disclosure suggests a method of including a capability condition of a WUS in enabling/disabling of the WUS. The enabling of the WUS means an operation of allowing a receiving end to monitor a WUS before monitoring a corresponding channel corresponding to the WUS. On the contrary, the disabling of the WUS means an operation of setting a receiving end not to expect that a WUS corresponding to a corresponding channel will be transmitted.

In the present specification, a WUS is defined as a signal (or channel) that can be monitored by a receiving end to obtain information related to a reception of a corresponding channel (see FIG. 9 and relevant description). In the present specification, the corresponding channel means a specific channel (or signal) from which a receiving end can obtain information related to a transmission through a WUS. For example, a corresponding channel may correspond to a channel (e.g., P-RNTI scrambled PDCCH, MPDCCH, NPDCCH) related to a paging (see FIG. 9 and relevant description). Here, the information related to the corresponding channel may include a presence or non-presence of transmission of the corresponding channel, information (e.g., monitoring cycle, monitoring timing, encoding scheme, etc.) related to transmission and monitoring of the corresponding channel, or a portion of information provided by the corresponding channel.

Hereinafter, for clarity of description, a single WUS corresponds to a single corresponding channel. In addition, the idea of the present disclosure is obviously applicable to a case that a single WUS corresponds to a plurality of corresponding channels. Although the following description assumes a situation of a DownLink (DL) transmission having a transmitting end (i.e., a transmitter) and a receiving end (i.e., a receiver) set to a base station (e.g., eNB, gNB, etc.) and a User Equipment (UE), respectively, it is obvious that a method suggested in the present disclosure is generally applicable to a situation of an UpLink (UL) transmission having a transmitter and a receiver set to a UE and a base station (e.g., eNB, gNB, etc.), respectively. Although the following description relates to a case that a corresponding channel corresponding to a WUS exists, it is obvious that the following description is applicable to a specific signal (e.g., a signal independently used without a corresponding channel corresponding to a WUS) used for other purposes as well as to the WUS.

The present disclosure considers a situation that a plurality of resource parts are operated in a single cell. In the present specification, a cell is a unit for a UE to access a network through acquisition of a synchronization signal and system information. And, the cell may retain a resource in time, frequency and space domains for a UE to perform data transmission/reception and schedule the resource. In the present specification, a resource part means a unit for a UE to perform data transmission/reception in a manner of dividing a resource, which is retained by a cell, in time, frequency and space domains into one or more regions and then scheduling the resource for the UE. For example, a narrowband in MTC, a carrier (anchor or non-anchor) in NB-IoT, a bandwidth part in NR, a beam index identified by beamforming and the like may correspond to resource parts. A WUS and a corresponding channel corresponding to the WUS assume an operation on the resource part. For example, if a UE camps on a specific resource part, the UE may be set to expect the monitoring of the WUS and the corresponding channel within the corresponding resource part. In the following description, in case that a UE selects one of a plurality of resource parts, a set of selectable resource parts will be defined and described as a resource part list.

In the current LTE standard, a WUS for MTC and NB-IoT is introduced and used in Release-15. In the NR standard, a WUS is raised as one of technology candidates for NR power saving in the Release-16 stage and discussion of the WUS is in progress.

Hereinafter, methods suggested in the present disclosure may be operated in dependently, or one or more of the methods may be operated by combination. In case of the operation by combination, a combination method may be determined depending on the decision made by a base station.

Method 1: WUS Enabling/Disabling Per Cell

In Method 1 according to the present disclosure, a configuration of enabling/disabling a WUS may be achieved in cell unit.

A method suggested in the present disclosure may include a method of enabling/disabling an operation related to a WUS in unit of a cell like Method 1. To this end, whether to enable/disable a WUS in a corresponding cell may be indicated through cell common system information that is not restricted to a specific resource part. For example, information related to enabling/disabling of a WUS may be indicated through Master Information Block (MIB) (or MIB-NB), System Information Block type 1 (SIB1) (or SIB1-NB), or SIB information applied to all resource parts in common.

As mentioned in the 'Disclosure in Accordance with the Present Disclosure', in case that a plurality of resource parts are operated in a single cell, a UE may need information on a resource part list and a reference for selecting a resource part. In a situation of applying Method 1 according to the present disclosure, if presence or non-presence of applicability of WUS is defined as capability from the perspective of a UE and a WUS capable UE and a WUS incapable UE exist in the same cell, an operating method of a resource part list and a reference for selecting a resource part may be determined as one of Method 1-1, Method 1-2, and Method 1-3 in the following.

[Method 1-1]

A WUS capable UE and a WUS incapable UE share the same resource part list and apply the same reference for selecting a resource part to monitor a WUS and/or a corresponding channel.

A method suggested in the present disclosure may include a method that a WUS capable UE and a WUS incapable UE use a resource part list and a resource part selection reference in common like Method 1-1.

In case of using Method 1-1, signaling overhead of a resource part list may be saved advantageously. If separate information is required for a resource part selecting method, signaling overhead for indicating this may be saved advantageously. In addition, since a definite resource part selection reference is always applicable irrespective of enabling/disabling of WUS from the perspective of a UE, an operation may be simplified advantageously.

In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. In addition, a WUS capable UE and a WUS incapable UE may use information on a weight value required for selecting a paging carrier in common. Here, the informations may be indicated through higher layer signaling (e.g., RRC layer signaling) such as System Information Block (SIB).

[Method 1-2]

A WUS capable UE and a WUS incapable UE share the same resource part list and apply different references for selecting a resource part to monitor a WUS and/or a corresponding channel, respectively.

A method suggested in the present disclosure may include a method that a WUS capable UE and a WUS incapable UE use different resource part selection references, respectively despite sharing a resource part list, like Method 1-2.

In case of using the method of Method 1-2, signaling overhead of a resource part list may be saved advantageously.

In case of using the method of Method 1-2, a WUS capable UE and a WUS incapable UE may reduce effects caused to each other advantageously. For example, a WUS capable UE needs transmission of WUS but a WUS may become unnecessary overhead of a WUS incapable UE. Hence, in case that a WUS is transmitted for a WUS capable UE, there may occur scheduling restriction that a WUS incapable UE is unable to receive a different signal or channel at the timing of transmitting the WUS. On the contrary, at the timing of transmitting a signal or channel for a WUS incapable UE, there may occur scheduling restriction that transmission of a WUS for a WUS capable UE is restricted. If a resource part selection reference of a WUS capable UE is different from that of a WUS incapable UE, the WUS capable UE and the WUS incapable UE are distributed to different resource parts, respectively, whereby the above-mentioned problem can be reduced advantageously.

In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. On the other hand, information on a weight value required for selecting a paging carrier of each of the WUS capable UE and the WUS incapable UE may be configured differently. In doing so, each of the UEs may check the paging carrier weight information suitable for WUS capability of its own and select a paging carrier using the checked information. Here, the above informations may be indicated through higher layer signaling (e.g., RRC layer signaling) such as SIB.

When Method 1-2 is used, the WUS capable UE may be set to determine that a case of signaling a resource part selection reference for the WUS capable UE only is a WUS enabled state.

[Method 1-3]

A WUS capable UE and a WUS incapable UE apply different resource part lists and also apply different references for selecting a resource part to monitor a WUS and/or a corresponding channel, respectively.

A method suggested in the present disclosure may include a method that a WUS capable UE and a WUS incapable UE use different resource part lists and different resource part selection references, respectively like Method 1-3.

In case of using the method of Method 1-3, a WUS capable UE and a WUS incapable UE may reduce effects caused to each other advantageously. For example, a WUS capable UE needs transmission of WUS but a WUS may become unnecessary overhead of a WUS incapable UE. Hence, in case that a WUS is transmitted for a WUS capable UE, there may occur scheduling restriction that a WUS incapable UE is unable to receive a different signal or channel at the timing of transmitting the WUS. On the contrary, at the timing of transmitting a signal or channel for a WUS incapable UE, there may occur scheduling restriction that transmission of a WUS for a WUS capable UE is restricted. If a resource part list and a resource part selection reference of a WUS capable UE are different from those of a WUS incapable UE, the WUS capable UE and the WUS incapable UE are distributed to different resource parts, respectively, whereby the above-mentioned problem can be reduced advantageously.

In case of NB-IoT, for typical example, when there is a cell supportive of a multi-carrier operation capable of using a single anchor carrier and a plurality of non-anchor carriers as carriers for the paging purpose, each of a WUS capable UE and a WUS incapable UE may differently configure information on a paging carrier list that is signaled by a BS. In addition, information on a weight value required for selecting a paging carrier of each of the WUS capable UE and the WUS incapable UE may be configured differently. In doing so, each of the UEs may check the paging carrier list and the paging carrier weight information, which are suitable for WUS capability of its own, and select a paging carrier using them. Here, the above informations may be indicated through higher layer signaling (e.g., RRC layer signaling) such as SIB.

When Method 1-3 is used, the WUS capable UE may be set to determine that a case of signaling a resource part list and/or a resource part selection reference for the WUS capable UE only is a WUS enabled state.

Method 2: WUS Enabling/Disabling Per Resource Part

In Method 2 according to the present disclosure, a configuration of enabling/disabling a WUS may be achieved in resource part unit.

A method suggested in the present disclosure may include a method of enabling/disabling an operation related to a WUS in unit of a resource part like Method 2. To this end, whether to enable/disable a WUS in each resource part of a corresponding cell may be indicated through cell common system information that is not restricted to a specific resource part. For example, information related to enabling/disabling of a WUS may be indicated through Master Information Block (MIB) (or MIB-NB), System Information Block type 1 (SIB1) (or SIB1-NB), or SIB information applied to all resource parts in common. Alternatively, whether to enable/disable a WUS in each resource part of a corresponding cell may be indicated through resource part specific system information. For example, information related to enabling/disabling of a WUS may be indicated through SIB information transmitted on each resource part.

When Method 2 is used together with Method 1, although a WUS is enabled through indication of a cell unit, if a specific resource part is configured to disable the WUS, the WUS can be disabled in the corresponding resource part.

Method 2 may be advantageous if a gain obtainable through a WUS differs per resource part or a reserved resource available for a WUS is different. For example, if transmission power of a WUS and/or a corresponding channel is different per resource part, a gain obtainable through the WUS may be different and there may be small or no gain attributed to the WUS in some resource part. For another example, if overhead of a transmission-expected signal or channel is different per resource part, a region of a valid resource on which a WUS is transmittable may be different, whereby scheduling restriction of a WUS and/or a different signal or channel may occur in some resource part. For typical example, in case of NB-IoT, transmission of a synchronization signal and system information should be performed on an anchor carrier and the density of UEs expecting a paging may be different per carrier (e.g., anchor carrier and non-anchor carrier). Therefore, in case that presence or non-presence of WUS enabling/disabling is determined in resource part unit by verifying suitability of WUS of each resource part, overhead due to WUS may be advantageously prevented from being generated from a WUS disabled resource part while a gain due to the WUS is maintained in a WUS enabled resource part.

In case of using Method 2, an operation of enabling/disabling of each resource part may be directly indicated by signaling. For example, a separate field indicating enabling/disabling of a WUS per resource part is configured in a higher layer signal such as SIB, and presence or non-presence of enabling/disabling of the WUS may be indicated using the field. This may be to accurately indicate presence or non-presence of enabling/disabling of a WUS of each resource part. In case of a WUS disabled resource part, since it is unnecessary to transmit information on WUS configuration from the perspective of a BS, an overhead reduction effect may be obtained. From the perspective of a UE, since it is unnecessary to additionally monitor information related to WUS configuration, a power saving effect may be obtained advantageously.

In case of using Method 2, an operation of enabling/disabling of each resource part may be indicated presence or non-presence of configuration information related to a WUS of the corresponding resource part. For example, if configuration information such as duration, occasion or the like of a WUS usable for a specific resource part exists, a UE may be aware that the WUS is enabled on the corresponding resource part. On the contrary, if configuration information such as duration, occasion or the like of a WUS usable for a specific resource part does not exist, a UE may be aware that the WUS is disabled on the corresponding resource part. Thus, since a separate signal related to enabling/disabling of a WUS is not generated, signaling overhead that may be unnecessary can be reduced advantageously.

In case of using Method 2, an operation of enabling/disabling of each resource part may be indicated using a portion of configuration information related to a WUS of the corresponding resource part. For example, if a duration of a WUS is independently configured for each resource part and the WUS duration of each resource part can be represented as n states (where n is an integer greater than 1), one state may be usable for the purpose of indicating a WUS disabling operation. Thus, since a separate signal related to enabling/disabling of a WUS is not generated, signaling overhead that may be unnecessary can be reduced advantageously.

As mentioned in the 'Disclosure in Accordance with the Present Disclosure', in case that a plurality of resource parts are operated in a single cell, a UE may need information on a resource part list and a reference for selecting a resource part. In a situation of applying Method 2, if presence or non-presence of applicability of WUS is defined as capability from the perspective of a UE and a WUS capable UE and a WUS incapable UE exist in the same cell, an operating method of a resource part list and a reference for selecting a resource part may be determined as one of Method 2-1, Method 2-2a, Method 2-2b, Method 2-3a, and Method 2-3bin the following.

[Method 2-1]

A WUS capable UE and a WUS incapable UE share the same resource part list and apply the same reference for selecting a resource part to monitor a WUS and/or a corresponding channel.

A method suggested in the present disclosure may include a method that a WUS capable UE and a WUS incapable UE use a resource part list and a resource part selection reference in common like Method 2-1. Here, the WUS capable UE may select a resource part irrespective of presence or non-presence of enabling/disabling of a WUS and expect an operation related to the WUS for a WUS enabled resource part only. If a WUS disabled resource part is selected, the UE does not expect the operation related to the WUS.

In case of using Method 2-1, signaling overhead of a resource part list may be saved advantageously. If separate information is required for a resource part selecting method, signaling overhead for indicating this may be saved advantageously. In addition, since a definite resource part selection reference is always applicable irrespective of enabling/disabling of WUS from the perspective of a UE, an operation may be simplified advantageously.

In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. In addition, a WUS capable UE and a WUS incapable UE may use information on a weight value required for selecting a paging carrier in common. Here, the informations may be indicated through higher layer signaling such as SIB or RRC layer signaling.

[Method 2-2a]

A WUS capable UE and a WUS incapable UE share the same resource part list and apply different references for selecting a resource part to monitor a WUS and/or a corresponding channel, respectively. In this case, the WUS capable UE may select a resource part irrespective of presence or non-presence of enabling/disabling of a WUS and expect an operation related to the WUS for a WUS enabled resource part only. If a WUS disabled resource part is selected, the UE does not expect the operation related to the WUS.

A method suggested in the present disclosure may include a method that a WUS capable UE and a WUS incapable UE use different resource part selection references, respectively despite sharing a resource part list, like Method 2-2a. Here, the WUS capable UE may select a resource part irrespective of presence or non-presence of enabling/disabling of a WUS and expect an operation related to the WUS for a WUS enabled resource part only. If a WUS disabled resource part is selected, the UE does not expect the operation related to the WUS.

In case of using Method 2-2a, signaling overhead of a resource part list may be saved advantageously.

In case of using Method 2-2a, a WUS capable UE and a WUS incapable UE may reduce effects caused to each other advantageously. For example, a WUS capable UE needs transmission of WUS but a WUS may become unnecessary overhead of a WUS incapable UE. Hence, in case that a WUS is transmitted for a WUS capable UE, there may occur scheduling restriction that a WUS incapable UE is unable to receive a different signal or channel at the timing of transmitting the WUS. On the contrary, at the timing of transmitting a signal or channel for a WUS incapable UE, there may occur scheduling restriction that transmission of a WUS for a WUS capable UE is restricted. If a resource part selection reference of a WUS capable UE is different from that of a WUS incapable UE, the WUS capable UE and the WUS incapable UE are distributed to different resource parts, respectively, whereby the above-mentioned problem can be reduced advantageously.

In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. On the other hand, information on a weight value required for selecting a paging carrier of each of the WUS capable UE and the WUS incapable UE may be configured differently. In doing so, each of the UEs may check the paging carrier weight information suitable for WUS capability of its own and select a paging carrier using the checked information. Here, the above informations may be indicated through higher layer signaling (e.g., RRC layer signaling) such as SIB.

[Method 2-2b]

A WUS capable UE and a WUS incapable UE share the same resource part list and apply different references for selecting a resource part to monitor a WUS and/or a corresponding channel, respectively. In this case, the WUS capable UE may select a WUS enabled resource part only and expect an operation related to the WUS on the selected resource part. The WUS capable UE does not select a WUS disabled resource part.

A method suggested in the present disclosure may include a method that a WUS capable UE and a WUS incapable UE use different resource part selection references, respectively despite sharing a resource part list, like Method 2-2b. In this case, the WUS capable UE may select a WUS enabled resource part only and expect an operation related to the WUS on the selected resource part. The WUS capable UE does not select a WUS disabled resource part.

In case of using Method 2-2b, signaling overhead of a resource part list may be saved advantageously.

In case of using Method 2-2b, a WUS capable UE and a WUS incapable UE may reduce effects caused to each other advantageously. For example, a WUS capable UE needs transmission of WUS but a WUS may become unnecessary overhead of a WUS incapable UE. Hence, in case that a WUS is transmitted for a WUS capable UE, there may occur scheduling restriction that a WUS incapable UE is unable to receive a different signal or channel at the timing of transmitting the WUS. On the contrary, at the timing of transmitting a signal or channel for a WUS incapable UE, there may occur scheduling restriction that transmission of a WUS for a WUS capable UE is restricted. If a resource part selection reference of a WUS capable UE is different from that of a WUS incapable UE, the WUS capable UE and the WUS incapable UE are distributed to different resource parts, respectively, whereby the above-mentioned problem can be reduced advantageously.

When Method 2-2b is used, since the WUS capable UE always selects a WUS enabled resource part, a gain related to WUS can be always expected advantageously.

In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. On the other hand, information on a weight value required for selecting a paging carrier of each of the WUS capable UE and the WUS incapable UE may be configured differently. In doing so, each of the UEs may check the paging carrier weight information suitable for WUS capability of its own and select a paging carrier using the checked information. Here, the above informations may be indicated through higher layer signaling such as SIB or RRC layer signaling.

In case of using Method 2-2b, a reference for a UE to select a resource part to monitor a WUS and/or a corresponding channel may be configured with a combination of enabling/disabling information of each resource part and a resource part selecting method used by a WUS incapable UE. For example, based on a resource part selecting method of a WU incapable UE, a WU capable UE may use a method of limiting a selection target to a WUS enabled resource part only. Here, the based resource part selecting method may include a parameter value configured to select a resource part, and the limited selection target may include a parameter value corresponding to the WUS enabled resource part.

In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. In addition, the WU capable UE and the WUS incapable UE may use information on a weight value required for selecting a paging carrier in common. In doing so, the WU incapable UE selects a paging carrier using a weight value for all paging carriers, but the WUS capable UE may be set to select a paging carrier using a weight value corresponding to a WUS enabled paging carrier among paging carriers only.

Alternatively, in case of using Method 2-2b, a reference for a UE to select a resource part to monitor a WUS and/or a corresponding channel may be determined according to a resource part selecting method separately configured according to capability of the UE. For example, a resource part selecting method of a WU capable UE and a resource part selecting method of a WU incapable UE may be configured separately. In case of NB-IoT, for typical example, when there is a cell supportive of a multi-carrier operation capable of using a single anchor carrier and a plurality of non-anchor carriers as carriers for the paging purpose, a WUS capable UE and a WUS incapable UE may use information on a paging carrier list, which is signaled by a BS, in common. On the other hand, information on a weight value required for selecting a paging carrier of each of the WUS capable UE and the WUS incapable UE may be configured differently. In this case, if some paging carrier is set as a WUS disabled carrier, a weight value of the corresponding paging carrier may be set to 0. In doing so, each of the UEs may check the paging carrier weight information suitable for WUS capability of its own and select a paging carrier using the checked information.

[Method 2-3a]

A WUS capable UE and a WUS incapable UE apply different resource part lists and also apply different references for selecting a resource part to monitor a WUS and/or a corresponding channel, respectively. Here, the WUS capable UE may select a resource part irrespective of presence or non-presence of enabling/disabling of a WUS and expect an operation related to the WUS for a WUS enabled resource part only. If a WUS disabled resource part is selected, the UE does not expect the operation related to the WUS.

A method suggested in the present disclosure may include a method that a WUS capable UE and a WUS incapable UE use different resource part lists and different resource part selection references, respectively like Method 2-3a. Here, the WUS capable UE may select a resource part irrespective of presence or non-presence of enabling/disabling of a WUS and expect an operation related to the WUS for a WUS enabled resource part only. If a WUS disabled resource part is selected, the UE does not expect the operation related to the WUS.

In case of using the method of Method 2-3a, a WUS capable UE and a WUS incapable UE may reduce effects caused to each other advantageously. For example, a WUS capable UE needs transmission of WUS but a WUS may become unnecessary overhead of a WUS incapable UE. Hence, in case that a WUS is transmitted for a WUS capable UE, there may occur scheduling restriction that a WUS incapable UE is unable to receive a different signal or channel at the timing of transmitting the WUS. On the contrary, at the timing of transmitting a signal or channel for a WUS incapable UE, there may occur scheduling restriction that transmission of a WUS for a WUS capable UE is restricted. If a resource part list and a resource part selection reference of a WUS capable UE are different from those of a WUS incapable UE, the WUS capable UE and the WUS incapable UE are distributed to different resource parts, respectively, whereby the above-mentioned problem can be reduced advantageously.

In case of NB-IoT, for typical example, when there is a cell supportive of a multi-carrier operation capable of using a single anchor carrier and a plurality of non-anchor carriers as carriers for the paging purpose, each of a WUS capable UE and a WUS incapable UE may differently configure information on a paging carrier list that is signaled by a BS. In addition, information on a weight value required for selecting a paging carrier of each of the WUS capable UE and the WUS incapable UE may be configured differently. In doing so, each of the UEs may check the paging carrier list and the paging carrier weight information, which are suitable for WUS capability of its own, and select a paging carrier using them. Here, the above informations may be indicated through higher layer signaling such as SIB or RRC layer signaling.

[Method 2-3b]

A WUS capable UE and a WUS incapable UE apply different resource part lists and also apply different references for selecting a resource part to monitor a WUS and/or a corresponding channel, respectively. In this case, the WUS capable UE may select a WUS enabled resource part only and expect an operation related to the WUS on the selected resource part. The WUS capable UE does not select a WUS disabled resource part.

A method suggested in the present disclosure may include a method that a WUS capable UE and a WUS incapable UE use different resource part lists and different resource part selection references, respectively like Method 2-3b. In this case, the WUS capable UE may select a WUS enabled resource part only and expect an operation related to the WUS on the selected resource part. The WUS capable UE does not select a WUS disabled resource part.

In case of using the method of Method 2-3b, a WUS capable UE and a WUS incapable UE may reduce effects caused to each other advantageously. For example, a WUS capable UE needs transmission of WUS but a WUS may become unnecessary overhead of a WUS incapable UE. Hence, in case that a WUS is transmitted for a WUS capable UE, there may occur scheduling restriction that a WUS incapable UE is unable to receive a different signal or channel at the timing of transmitting the WUS. On the contrary, at the timing of transmitting a signal or channel for a WUS incapable UE, there may occur scheduling restriction that transmission of a WUS for a WUS capable UE is restricted. If a resource part list and a resource part selection reference of a WUS capable UE are different from those of a WUS incapable UE, the WUS capable UE and the WUS incapable UE are distributed to different resource parts, respectively, whereby the above-mentioned problem can be reduced advantageously.

In case of using Method 2-3b, a WUS capable UE always selects a WUS enabled resource part, whereby a gain related to a WUS can be always expected advantageously.

In case of NB-IoT, for typical example, when there is a cell supportive of a multi-carrier operation capable of using a single anchor carrier and a plurality of non-anchor carriers as carriers for the paging purpose, each of a WUS capable UE and a WUS incapable UE may differently configure information on a paging carrier list that is signaled by a BS. In addition, information on a weight value required for selecting a paging carrier of each of the WUS capable UE and the WUS incapable UE may be configured differently. In doing so, each of the UEs may check the paging carrier list and the paging carrier weight information, which are suitable for WUS capability of its own, and select a paging carrier using them. Here, the above informations may be indicated through higher layer signaling such as SIB or RRC layer signaling.

In case of using Method 2-3b, a reference for a UE to select a resource part to monitor a WUS and/or a corresponding channel may be determined according to a resource part selecting method separately configured according to capability of the UE. For example, a resource part list and a resource part selecting method of a WU capable UE and a resource part list and a resource part selecting method of a WU incapable UE may be configured separately. In case of NB-IoT, for typical example, when there is a cell supportive of a multi-carrier operation capable of using a single anchor carrier and a plurality of non-anchor carriers as carriers for the paging purpose, information on a paging carrier list of a WUS capable UE and information on a paging carrier list of a WUS incapable UE may be configured different from each other. In addition, information on a weight value required for selecting a paging carrier of each of the WUS capable UE and the WUS incapable UE may be configured different from each other. In this case, if some paging carrier is set as a WUS disabled carrier, a weight value of the corresponding paging carrier may be set to 0. In doing so, each of the UEs may check the paging carrier weight information suitable for WUS capability of its own and select a paging carrier using the checked information.

Method 3: WUS Enabling/Disabling Per UE

In Method 3 according to the present disclosure, a configuration of enabling/disabling a WUS may be achieved per UE.

A method suggested in the present disclosure may include a method of enabling/disabling an operation related to a WUS per UE like Method 3. To this end, whether to enable/disable a WUS per UE may be indicated through a higher layer signal provided per UE. For example, information related to enabling/disabling of a WUS may be indicated through information such as RRC signaling received in a state that a UE is in connected mode (or in a process for switching to a connected mode after Random Access CHannel (RACH) (or a random access procedure)). Alternatively, whether to enable/disable a WUS in each resource part of a corresponding cell may be indicated through cell common system information that is not restricted to a specific resource part. For example, information related to enabling/disabling of a WUS may be indicated through Master Information Block (MIB, or MIB-NB), System Information Block type 1 (SIB1 or SIB1-NB), or SIB information applied to all resource parts in common. Alternatively, whether to enable/disable a WUS in each resource part of a corresponding cell may be indicated through resource part specific system information. For example, information related to enabling/disabling of a WUS may be indicated through SIB information transmitted on each resource part. One or more of the above informations may be usable in a manner of being combined together.

When Method 1 and/or Method 2 is used together with Method 3, although a WUS is enabled through indication of cell and/or resource part unit, in case that a specific UE is configured to disable a WUS, the corresponding UE does not expect an operation related to the WUS. On the contrary, although a WUS is disabled through indication of cell and/or resource part unit, in case that a specific UE is configured to enable a WUS, the corresponding UE may expect an operation related to the WUS.

The method of Method 3 may have a different gain obtainable through a WUS per UE or an advantage from the perspective of controlling overhead due to the WUS. For example, a gain obtainable through a WUS may be different according to a coverage of each UE or a Coverage Enhancement (CE) mode, and a UE of some coverage may have a small gain attributed to a WUS or may not have a gain attributed to the WUS. For another example, from the perspective of a BS, in case of a UE having frequent occurrences of WUS transmission or a UE having a large overhead in comparison to a gain attributed to a WUS, a control per UE for overhead control may be necessary. In addition, when there is small or no gain that can be expected by UEs targeting a specific service according to a configuration situation of a WUS, a method of disabling a WIS selectively for target UEs may be gainful in aspects of BS's overhead and UE's power consumption. On the other hand, for example, from the whole cell perspective, a common signal or channel is designated to disable a WUS, and it may be necessary to allow a WUS restrictively in case of a UE in connected mode.

As described above, in order to enable/disable a WUS by targeting a specific UE, information exchange between a BS and a UE may be required to perform the enabling/disabling. As mentioned in the 'Disclosure in Accordance with the Present Disclosure', in case that a plurality of resource parts are operated in a single cell, a UE may need information on a resource part list and a reference for selecting a resource part. In a situation of applying Method 3, if presence or non-presence of applicability of WUS is defined as capability from the perspective of a UE and a WUS capable UE and a WUS incapable UE exist in the same cell, a reference for enabling/disabling a WUS of a specific UE, an operating method of a resource part list and a reference for selecting a resource part may be determined as one of Method 3-1, Method 3-2, and Method 3-3 in the following.

[Method 3-1]

A UE may determine presence of non-presence of a WUS related operation according to a coverage condition of its own.

A method suggested in the present disclosure may include a method of enabling/disabling a WUS related operation according to a coverage of a UE like Method 3-1.

As a specific method to which Method 3-1 is applied, if a coverage level of a UE is equal to or higher than a specific threshold value, it may be determined to disable a WUS. The object of this is to prepare for a case that a configuration of a WUS supported in a cell or resource part from which a UE expects a WUS is not suitable for the corresponding UE to detect (or decode) the WUS. For example, when a WUS transmitted duration is R and a required WUS duration necessary for a specific UE to detect a WUS is R', if R'>R, the corresponding UE may not perform an operation related to the WUS normally.

Alternatively, as a specific method to which Method 3-1 is applied, if a coverage level of a UE is lower than a specific threshold value, it may be determined to disable a WUS. The object of this is to obtain a gain in aspect of overhead management of a BS if a configuration of a WUS supported in a cell or resource part from which a UE expects a WUS has a small or no gain that can be obtained by the corresponding UE through the WUS. For example, when a WUS transmitted duration is R and a required WUS duration necessary for a specific UE to detect a WUS is R', if R'<<R (where '<<' indicates 'very small') and a gain through the WUS is inadequate, a BS may determine the corresponding UE not to perform an operation related to the WUS.

Alternatively, as a specific method to which Method 3-1 is applied, if a coverage level of a UE is equal to or higher than a specific threshold value, it may be determined to enable a WUS. One object of this is for a BS to allow a WUS only to the UE that guarantees a gain through the WUS after a BS has checked the coverage level of the UE. This may be to raise efficiency in comparison to a transmission resource from the whole network perspective by reducing overhead from the perspective of a BS.

Alternatively, as a specific method to which Method 3-1 is applied, if a coverage level of a UE is lower than a specific threshold value, it may be determined to enable a WUS. One object of this is for a BS to allow a WUS only if the coverage level of the UE is checked by the BS and confirmed that the UE is suitable to receive the WUS. This may be to prevent a case of missing a WUS and a corresponding channel both if the UE fails to belong to a coverage level suitable for obtaining the WUS.

Here, in the above description, the coverage level of the UE may be the configuration information used for the UE to monitor other signals or channels. For example, the configuration information may use a specific parameter value configured when the UE is in connected mode. As a typical example, a repetition level (e.g., Rmax or a repetition value of MPDCCH/NPDCCH received last) of MPDCCH or NPDCCH configured for a UE in connected mode in MTC or NB-IoT may be used as a reference for determining a coverage level of the UE.

In the above description, the threshold value may be determined by the BS, and this value may be indicated to the UE through higher layer signaling such as SIB or RRC layer signal. Alternatively, the threshold value in the above description may be a value determined by a parameter related to a WUS. For example, the threshold value may be determined in form of a function that reflects a duration value of a WUS configured in unit of a cell or resource part.

[Method 3-2]

A UE may determine presence of non-presence of a WUS related operation depending on a mode determined according to a coverage condition of its own.

A method suggested in the present disclosure may include a method of enabling/disabling a WUS related operation depending on a mode determined according to a coverage of a UE like Method 3-2. For typical example, in case of MTC, it may be set to determine presence or non-presence of a WUS depending on a UE's CE mode determined according to a coverage level of the UE. Namely, a configuration related to a configuration related to a corresponding channel may be changed according to a CE mode of a UE, whereby transmission gain vs. overhead efficiency of a WUS may be different.

[Method 3-3]

If a UE is an enhanced coverage restricted UE, it may determine presence of non-presence of enabling/disabling of a specific WUS related operation.

According to the present standard, a BS receives information of an enhanced coverage restricted Information Element (IE) of a specific UE from a Mobility Management Entity (MME), and may determine presence or non-presence of configuration and support of an enhanced coverage related operation using the received information. Likewise, a UE reports the enhanced coverage restriction in an Attach/TAU step and checks presence or non-presence of support of the enhanced coverage restriction through an Attach TAU Accept message. Hence, the presence or non-presence of the enhanced coverage restriction of the UE may be utilized as information recognized identically by the UE and the BS.

A method suggested in the present disclosure may include a method of enabling/disabling a specific WUS related operation depending on whether a UE is an enhanced coverage restricted UE like Method 3-3. Here, when WUSs of a plurality of types exist (or a plurality of configurations exist for the same WUS), the specific WUS means a predetermined WUS (or WUS configuration) among them. To this end, a BS may indicate presence or non-presence of support of a specific WUS for an enhanced coverage restricted UE only through higher layer signaling such as SIB or RRC signaling. If the specific WUS is enabled, the BS may use the specific WUS for the transmission of the WUS for the enhanced coverage restricted UE. In addition, if the specific WUS is enabled and the UE is set as the enhanced coverage restricted UE, the UE may be set to expect the specific WUS.

Method 4 & Method 5: WUS Enabling/Disabling Per UE Capability

In Method 4 and Method 5 according to the present disclosure, methods applicable to a case that a plurality of WUS capabilities exist are suggested. Method 4 and Method 5 consider a case that a plurality of WUS types exist and that a WUS capability exits per WUS, without separate description.

[Method 4]

A configuration of enabling/disabling a WUS may be independently configured per WUS type.

A method suggested in the present disclosure may include a method that a configuration of enabling/disabling a WUS is independently configured per WUS type like Method 4. To this end, information of enabling/disabling for each WUS may be included in higher layer signaling in a manner of being represented in an independently identifiable signaling region. For example, a BS may transmit enabling/disabling information identifiable per WUS type in a manner of including the information in higher layer signaling such as SIB or RRC signaling. In this case, a UE may obtain enabling/disabling information on a recognizable WUS with reference to a WUS capability of its own and then apply it.

Namely, the BS may allow the UE to select a type of a WUS to be appropriate for a situation. For example, when the number of UEs having a specific WUS capability is relatively greater than the number of UEs having another WUS capability, if a radio resource situation of a BS is not appropriate for operating two types of WUSs both, the BS may select and support a WUS capability supported by a majority of UEs only.

If one WUS capability is defined to enable the support of WUSs of a plurality of types, it is necessary to define an operation for a case that a UE having the corresponding capability obtains enabling/disabling signaling information on a WUS. For example, the following case may be considerable. First of all, there are WUSs of two types such as WUS-A and WUS-B, a WUS-A capable UE is defined to support both WUS-A and WUS-B, and a WUS-B capable UE is defined to support WUS-B only. In this case, if WUS-A is enabled only, the WUS-A capable UE may be set to expect WUS-A and the WUS-B capable UE may be set not to expect a WUS related operation. If WUS-B is enabled only, both of the WUS-A capable UE and the WUS-B capable UE may be set to expect WUS-B. if WUS-A and WUS-B are enabled both, the WUS-A capable UE and the WUS-B capable UE may be set to expect WUS-A and WUS-B, respectively. In this case, if the enabling/disabling for WUS-A is applied in resource part unit, a reference for the WUS-A capable UE to select a WUS may be determined in resource part unit. In the above description, WUS-A and WUS-B are random names used to describe two types of WUSs. And, a name of an actually used WUS may be different.

In the method suggested in Method 4, a specific form of providing higher layer signaling may employ a combination of the methods suggested in Method 1, Method 2 and Method 3. In this case, structures of enabling/disabling WUSs may be identical to or different from each other. For example, when there are WUSs of two types such as WUS-C and WUS-D, if enabling/disabling for WUS-C employs the way of Method 1, enabling/disabling for WUS-D may use Method 1 exactly or one of Method 2 and Method 3. In the above description, WUS-C and WUS-D are random names used to describe two types of WUSs. And, a name of an actually used WUS may be different.

[Method 5]

Only if a specific WUS is enabled, an enabling/disabling configuration for another specific WUS may be configured.

A method suggested in the present disclosure may include a method that only if a specific WUS is enabled, a configuration of enabling/disabling for another specific WUS is configured. For example, the following situation may be considered. First of all, WUSs of two types such as WUS-1 and WUS-2 exist, a WUS-1 capable UE may support WUS-1 and WUS-2 both, and a wUS-2 capable UE may support WUS-2 only. In this case, a configuration for enabling/disabling of WUS-1 may be set to be enabled only if WUS-2 is enabled. Here, if WUS-1 is disabled, the WUS-1 capable UE may be set to expect WUS-2. In the above description, WUS-1 and WUS-2 are random names used to describe two types of WUSs. And, a name of an actually used WUS may be different. To this end, information of enabling/disabling for WUS-1 may be included in higher layer signaling in a manner of being added to a sub-region of a signaling region for enabling/disabling or configuration information.

An object of this may be to reduce signaling overhead required for enabling/disabling for WUSs when a plurality of types of WUSs exist. In the above example, if the configuration for WUS-1 can always assume a case that WUS-2 exists, WUS-1 is enabled. Information required for a configuration for configuring this may be set to utilize a portion of configuration information of WUS-2. In this case, signaling overhead can be reduced advantageously in comparison with an independent configuration.

In the method suggested in Method 5, a specific form of providing higher layer signaling may employ a combination of the methods suggested in Method 1, Method 2 and Method 3. In this case, structures of enabling/disabling WUSs may be identical to or different from each other. For example, if enabling/disabling for WUS-1 employs the way of Method 1 in the above example, the enabling/disabling for WUS-2 may use Method 1 exactly or one of Method 2 and Method 3.

FIG. 10 shows a flowchart of a method according to the present disclosure. Although FIG. 10 is described centering on an operation of a UE, it may be sufficiently understandable that a BS performs an operation corresponding to an operation of the UE.

In a step S1002, a UE may receive configuration information related to WUS enabling/disabling. In case of applying Method 1 according to the present disclosure, the configuration information related to the WUS enabling/disabling may be configured in cell unit (and/or cell-commonly). As described in Method 1, presence or non-presence of the WUS enabling/disabling may be indicated through cell-common system information (e.g., MIB, MIB-NB, SIB1, SIB1-NB, or system information applied to all resource parts in common) not restricted to a specific resource part, and the configuration information related to the WUS enabling/disabling may be transceived through cell common system information. For further specific description, the entire description of Method 1 is included herein as a reference.

In the step S1002, in case of applying Method 2 according to the present disclosure, the configuration information related to the WUS enabling/disabling may be configured in resource part unit (and/or resource part-specifically). For example, as described in Method 2, presence or non-presence of the WUS enabling/disabling may be indicated through cell-common system information (e.g., MIB, MIB-NB, SIB1, SIB1-NB, or system information applied to all resource parts in common) not restricted to a specific resource part, and the configuration information related to the WUS enabling/disabling may be transceived through cell common system information. For another example, as described in Method 2, presence or non-presence of the WUS enabling/disabling may be indicated through resource part specific system information and the configuration information related to the WUS enabling/disabling may be transceived through resource part specific system information. In addition, Method 1 and Method 2 are applicable together. Although WUS is already enabled in cell unit (and/or cell-commonly) according to Method 1, if a WUS is disabled on a specific resource part based on the configuration information according to Method 2, the WUS may be disabled on the specific resource part. For further specific description, the entire description of Method 2 is included herein as a reference.

In the step S1002, in case of applying Method 3 according to the present disclosure, the configuration information related to the WUS enabling/disabling may be configured per UE (and/or UE-specifically). For example, as described in Method 3, since presence or non-presence of the WUS enabling/disabling per UE may be indicated through higher layer signaling provided per UE, the configuration information related to the WUS enabling/disabling may be transceived through a higher layer signal (e.g., an RRC layer signal transceived in connected state or in the process of switching to a connected state after a random access procedure). For another example, as described in Method 3, presence or non-presence of the WUS enabling/disabling on each resource part of a cell may be indicated through cell-common system information (e.g., MIB, MIB-NB, SIB1, SIB1-NB, or system information applied to all resource parts in common), and the configuration information related to the WUS enabling/disabling may be transceived through cell common system information. For further example, as described in Method 3, presence or non-presence of the WUS enabling/disabling on each resource part may be indicated through resource part specific system information and the configuration information related to the WUS enabling/disabling may be transceived through system information applied per resource part of a cell. For further specific description, the entire description of Method 3 is included herein as a reference.

Method 3 may be used together with Method 1 and/or Method 2. For example, although a WUS is already enabled in cell unit (and/or cell-commonly) or per resource part of a cell (and/or resource part-specifically) according to Method 1 and/or Method 2, a WUS may be disabled UE-specifically for each UE based on the configuration information according to Method 3. Alternatively, although a WUS is already disabled in cell unit (and/or cell-commonly) or per resource part of a cell (and/or resource part-specifically) according to Method 1 and/or Method 2, a WUS may be abled UE-specifically for each UE based on the configuration information according to Method 3.

In the step S1002, in case of applying Method 4 according to the present disclosure, the configuration information related to the WUS enabling/disabling may be configured per WUS type (and/or WUS-specifically). For example, as described in Method 4, as the information related to the enabling/disabling for each WUS is independently identified and transceived through a higher layer signal (e.g., SIB or RRC layer signal), and a UE may obtain configuration information related to the WUS enabling/disabling for a WUS, which can be recognized by the UE, based on capability of its own. For further specific description, the entire description of Method 4 is included herein as a reference.

In the step S1002, in case of applying Method 5 according to the present disclosure, regarding the configuration information related to the WUS enabling/disabling, only if a specific WUS is enabled, the enabling/disabling for another specific WUS may be configured. For example, as described in Method 5, configuration information related to enabling/disabling for a first WUS (e.g., WUS-1) may be configured only if a second WUS (e.g., WUS-2) is enabled. In this example, if the first WUS is disabled, the second WUS may be configured to be enabled. Or, configuration information related to the enabling/disabling for the second WUS may be configured. In this example, the configuration information related to the second WUS enabling/disabling may include the configuration information related to the first WUS enabling/disabling (as sub-information). For further specific description, the entire description of Method 5 is included herein as a reference.

In a step S1004, if the WUS is enabled, the UE may monitor the WUS and/or a channel corresponding to the WUS. If Method 1 according to the present disclosure is applied, the configuration information may include a resource part list for a UE (WUS capable or WUS incapable) based on one of Methods 1-1 to 1-3. The UE (WUS capable or WUS incapable) may select a resource part based on one of Methods 1-1 to 1-3 and monitor a WUS and/or a channel corresponding to the WUS. For further specific description, the entire description of Method 1 is included herein as a reference.

In the step S1004, in case of applying Method 2 according to the present disclosure, the configuration information may include a resource part list for the UE (WUS capable or WUS incapable) based on one of Methods 2-1 to 2-3b. The UE (WUS capable or WUS incapable) may select a resource part based on one of Methods 2-1 to 2-3b and monitor a WUS and/or a channel corresponding to the WUS. For further specific description, the entire description of Method 3 is included herein as a reference.

In the step S1004, in case of applying Method 3 according to the present disclosure, the UE may determine whether a WUS for the UE is enabled based on one of Methods 3-1 to 3-3 and monitor a WUS and/or a channel corresponding to the WUS if the WUS is enabled. For example, in case of applying Method 301, if a coverage level of the UE is greater than a specific threshold value based on the configuration information, the UE may determine that a wake up signal is disabled. If a coverage level of the UE is smaller than a specific threshold value based on the configuration information, the UE may determine that a wake up signal is disabled. If a coverage level of the UE is greater than a specific threshold value based on the configuration information, the UE may determine that a wake up signal is enabled. If a coverage level of the UE is smaller than a specific threshold value based on the configuration information, the UE may determine that a wake up signal is enabled. In this example, the coverage level may correspond to a maximum repetition count of a channel corresponding to a wake up signal or a repetition count of a channel corresponding to a wake up signal received last by the UE. Moreover, in this example, the specific threshold value may be indicated through a higher layer signal (e.g., SIB or RRC layer signal). If a WUS is disabled, the UE does not expect a WUS related operation (e.g., an operation of monitoring a WUS and/or a channel corresponding to the WUS) (or skips the WUS related operation). For further specific description, the entire description of Method 3 is included herein as a reference.

In the step S1004, in case of applying Method 4 according to the present disclosure, for example, if a first WUS (e.g., WUS-A) is enabled only, a first WUS capable UE may perform an operation related to the first WUS (e.g., an operation of monitoring the first WUS and/or a channel corresponding to the first WUS) and a second WUS capable UE does not expect (or skips) an operation related to a second WUS (e.g., WUS-B) (e.g., an operation of monitoring the second WUS and/or a channel corresponding to the second WUS). If the second WUS is enabled only, each of the first WUS capable UE and the second WUS capable UE may perform the operation related to the second WUS. If both of the first WUS and the second WUS are enabled, the first WUS capable UE may perform the operation related to the first WUS and the second WUS capable UE may perform the operation related to the second WUS. For further specific description, the entire description of Method 4 is included herein as a reference.

In the step S1004, assuming that the configuration information related to a second WUS enabling/disabling includes the configuration information related to a first WUS enabling/disabling (as sub-information) by applying Method 5 according to the present disclosure, that a first WUS capable UE can support a first WUS (e.g., WUS-1) and a second WUS (e.g., WUS-2) both, and that a second WUS capable UE supports the second WUS only, if the first WUS is disabled, the first WUS capable UE does not expect (or skips) an operation related to the first WUS (e.g., an operation of monitoring the first WUS and/or a channel corresponding to the first WUS) and determines presence or non-presence of enabling/disabling of the second WUS. If the second WUS is enabled, the first WUS capable UE may perform an operation related to the second WUS (e.g., an operation of monitoring the second WUS and/or a channel corresponding to the second WUS). For further specific description, the entire description of Method 5 is included herein as a reference.

In the step S1004, if the WUS is disabled, the UE does not expect (or skips) an operation related to the corresponding WUS (e.g., an operation of monitoring the first WUS and/or a channel corresponding to the first WUS).

Although the present disclosure is described in FIG. 10 in a manner of being categorized into Methods 1 to 5, the methods may be executed independently or in a manner of being combined with each other. Although the combination of Method 1 and Method 2, the combination of Methods 1 to 3 are described as examples, by which the present disclosure is non-limited. In addition, the present disclosure may be implemented by other combinations thereof.

Structures of Apparatuses

Figure 11:
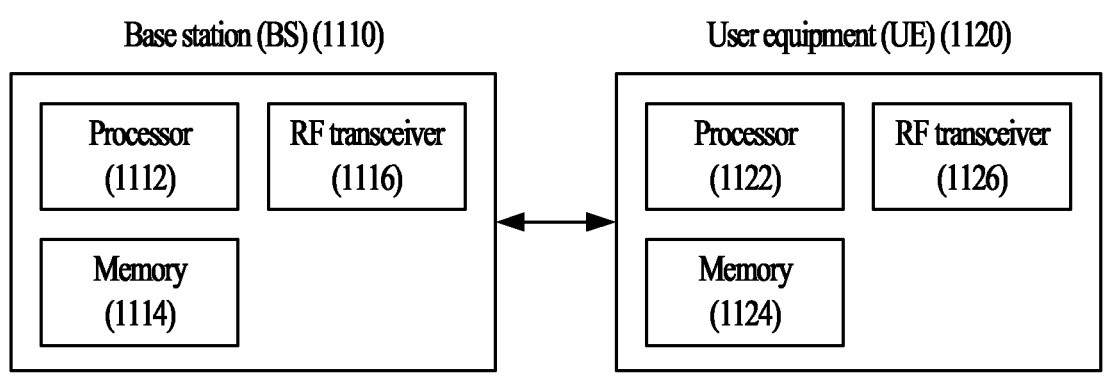
FIG. 11 illustrates a base station and a user equipment to which the present invention is applicable.

FIG. 11 illustrates a base station (BS) and a user equipment (UE) to which the present invention is applicable.

Referring to FIG. 11, a wireless communication system includes the BS 1110 and the UE 1120. When the wireless communication system includes a relay, the BS 1110 or the UE 1120 may be replaced with the relay.

The BS 1110 includes a processor 1112, a memory 1114, and a radio frequency (RF) transceiver 1116. The processor 1112 may be configured to embody the procedures and/or methods proposed by the present invention. The memory 1114 is connected to the processor 1112 and stores various pieces of information associated with an operation of the processor 1112. The RF transceiver 1116 is connected to the processor 1112 and transmits/receives a radio signal. The UE 1120 includes a process 1122, a memory 1124, and an RF transceiver 1126. The processor 1122 may be configured to embody the procedures and/or methods proposed by the present invention. The memory 1124 is connected to the processor 1122 and stores various pieces of information associated with an operation of the processor 1122. The RF transceiver 1126 is connected to the processor 1122 and transmits/receives a radio signal.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present invention may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

What is claimed is:

1. A method of receiving a downlink signal by a user equipment (UE) in a wireless communication system, the method comprising:
receiving, through at least one of a UE-specific radio resource control (RRC) layer signal or cell-common system information, a configuration including (i) information related to enabling or disabling of a wake up signal (WUS), (ii) a maximum WUS duration which is represented as a ratio with a maximum repetition count related to a physical downlink control channel (PDCCH), (iii) a number of consecutive paging occasions (POs) associated with the WUS, the number of the consecutive POs being a number of POs in which the UE will not monitor the PDCCH upon failure of detecting the WUS, and (iv) gap information related to a time gap ranging from an end of the maximum WUS duration to an initial PO associated with the WUS;
determining whether to monitor the WUS based on the configuration including the information related to enabling or disabling of the WUS; and
monitoring the PDCCH upon detection of the WUS, wherein the PDCCH is scrambled with a paging-radio network temporary identifier (P-RNTI),
wherein in a state where (a) both of the UE-specific RRC layer signal and the cell-common system information are received by the UE, (b) the UE-specific RRC layer signal includes information for disabling of the WUS based on that a coverage level of the UE is smaller than a threshold, and (c) the UE-specific RRC layer signal and the cell-common system information are in conflict with each other in that the cell-common system information includes information for enabling of the WUS whereas the UE-specific RRC layer signal includes the information for disabling of the WUS: the UE determines to skip the WUS monitoring.

2. The method of claim 1,
wherein the cell-common system information represents system information commonly applied to all resource parts of a cell, and the resource part represents a unit of a region used for data transmission and reception of the UE among resources of the cell.

3. The method of claim 1, wherein the coverage level corresponds to a maximum repetition number of a channel corresponding to the WUS or a repetition number of the channel corresponding to the WUS lastly received by the UE.

4. The method of claim 3, wherein the threshold is indicated through a higher layer signal.

5. The method of claim 1, wherein the WUS includes at least one of a first type WUS or a second type WUS.

6. The method of claim 5, wherein in a case where the WUS includes only the first type WUS or both the first type WUS and the second type WUS, the WUS monitoring is supported by all of a plurality of UEs including the UE, and
wherein in a case where the WUS include only the second type WUS, the WUS monitoring is supported by only a subgroup of the plurality of UEs which has a specific capability.

7. A user equipment (UE) for receiving a downlink signal in a wireless communication system, the UE comprising:
a radio frequency (RF) transceiver; and
a processor operatively connected to the RF transceiver,
wherein the processor is configured to control the RF transceiver to receive, through at least one of a UE-specific radio resource control (RRC) layer signal or cell-common system information, a configuration including (i) information related to enabling or disabling of a wake up signal (WUS), (ii) a maximum WUS duration which is represented as a ratio with a maximum repetition count related to a physical downlink control channel (PDCCH), (iii) a number of consecutive paging occasions (POs) associated with the WUS, the number of the consecutive POs being a number of POs in which the UE will not monitor the PDCCH upon failure of detecting the WUS, and (iv) gap information related to a time gap ranging from an end of the maximum WUS duration to an initial PO associated with the WUS, determine whether to monitor the WUS based on the configuration including the information related to enabling or disabling of the WUS, and monitor the PDCCH upon detection of the WUS, wherein the PDCCH is scrambled with a paging-radio network temporary identifier (P-RNTI),
wherein in a state where (a) both of the UE-specific RRC layer signal and the cell-common system information are received by the processor, (b) the UE-specific RRC layer signal includes information for disabling of the WUS based on that a coverage level of the UE is smaller than a threshold, and (c) the UE-specific RRC layer signal and the cell-common system information are in conflict with each other in that the cell-common system information includes information for enabling of the WUS whereas the UE-specific RRC layer signal includes the information for disabling of the WUS: the processor determines to skip the WUS monitoring.

* * * * *